United States Patent
Hwang

(10) Patent No.: US 11,521,111 B2
(45) Date of Patent: Dec. 6, 2022

(54) DEVICE AND METHOD FOR RECOMMENDING CONTACT INFORMATION

(71) Applicant: Samsung Electronics Co., Ltd., Suwon-si (KR)

(72) Inventor: Jinyoung Hwang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 759 days.

(21) Appl. No.: 16/232,481

(22) Filed: Dec. 26, 2018

(65) Prior Publication Data
US 2019/0197427 A1    Jun. 27, 2019

(30) Foreign Application Priority Data

Dec. 22, 2017 (KR) .................. 10-2017-0178737
Dec. 19, 2018 (KR) .................. 10-2018-0164959

(51) Int. Cl.
*G06Q 10/00* (2012.01)
*G06N 20/00* (2019.01)
(Continued)

(52) U.S. Cl.
CPC ............ *G06N 20/00* (2019.01); *G06F 16/22* (2019.01); *G06F 16/24575* (2019.01); *G06Q 10/00* (2013.01); *H04M 3/00* (2013.01)

(58) Field of Classification Search
CPC ... G06N 20/00; G06F 16/22; G06F 16/24575; G06Q 10/00; H04M 3/00
See application file for complete search history.

(56) References Cited

U.S. PATENT DOCUMENTS 8,744,995 B1* 6/2014 Hewinson ............ G06F 16/313
                                                              707/603
8,862,108 B2  10/2014 Lee et al.
(Continued)

FOREIGN PATENT DOCUMENTS

CN        102368800 A    3/2012
CN        104168351 A    11/2014
(Continued)

OTHER PUBLICATIONS

Sujith Ravi; "Graph-powered Machine Learning at Google"; Google AI blog; Oct. 6, 2016; https://research.googleblog.com/2016/10/graph-powered-machine-learning-atgoogle.html (Oct. 6, 2016).
(Continued)

*Primary Examiner* — Beau D Spratt
(74) *Attorney, Agent, or Firm* — Jefferson IP Law, LLP

(57) ABSTRACT

A device is provided. The device includes a processor and a memory configured to store instructions executable by the processor. The processor is configured to execute the instructions to extract context information from displayed data based on an application which is being executed by the device, identify an identifier from the context information, search for at least one recommended contact related to the identifier based on the identifier and a relation graph obtained by inputting information regarding a communication between a plurality of users into a first training model for determining an association between the plurality of users, identify a priority of the at least one recommended contact, and control to display the at least one recommended contact according to the priority.

17 Claims, 15 Drawing Sheets

(51) Int. Cl.
*G06F 16/22* (2019.01)
*G06F 16/2457* (2019.01)
*H04M 3/00* (2006.01)

(56) References Cited

U.S. PATENT DOCUMENTS

| | | | |
|---|---|---|---|
| 9,104,681 B2 | 8/2015 | Kang | |
| 9,104,768 B2 | 8/2015 | Paglia et al. | |
| 9,262,551 B2 | 2/2016 | Wilson et al. | |
| 9,990,105 B2* | 6/2018 | D'Argenio | G06F 3/04883 |
| 10,324,583 B2* | 6/2019 | Jiang | G06F 3/0482 |
| 10,366,620 B2* | 7/2019 | Conway | G09B 7/00 |
| 2005/0086050 A1 | 4/2005 | Meyers et al. | |
| 2009/0319466 A1 | 12/2009 | Liu et al. | |
| 2010/0029260 A1 | 2/2010 | Kim et al. | |
| 2012/0311139 A1 | 12/2012 | Brave et al. | |
| 2012/0330993 A1* | 12/2012 | Faiman | G06Q 10/107 707/769 |
| 2013/0054801 A1* | 2/2013 | Belchee | G06F 21/105 709/225 |
| 2013/0067039 A1* | 3/2013 | Hartzler | G06Q 10/10 709/219 |
| 2013/0163742 A1 | 6/2013 | Lim et al. | |
| 2013/0346347 A1 | 12/2013 | Patterson et al. | |
| 2014/0006420 A1 | 1/2014 | Sparrow et al. | |
| 2014/0066044 A1 | 3/2014 | Ramnani et al. | |
| 2014/0122605 A1* | 5/2014 | Merom | G06Q 10/10 709/204 |
| 2014/0280097 A1* | 9/2014 | Lee | G06Q 50/01 707/723 |
| 2015/0301838 A1* | 10/2015 | Steeves | H04M 3/42051 715/708 |
| 2016/0191654 A1* | 6/2016 | Healey | H04L 67/303 709/228 |
| 2016/0205057 A1 | 7/2016 | Wang et al. | |
| 2016/0232625 A1* | 8/2016 | Akutagawa | H04L 51/14 |
| 2016/0371541 A1 | 12/2016 | Jiang et al. | |
| 2017/0034324 A1 | 2/2017 | Zhang et al. | |
| 2017/0124106 A1* | 5/2017 | Jeffers | G06Q 50/01 |
| 2017/0318077 A1* | 11/2017 | Borse | G06F 16/2455 |
| 2018/0032585 A1* | 2/2018 | Kadiyala | G06N 20/00 |
| 2018/0158163 A1* | 6/2018 | Zhang | G06Q 50/2057 |

FOREIGN PATENT DOCUMENTS

| | | |
|---|---|---|
| CN | 104182422 A | 12/2014 |
| CN | 104702759 A | 6/2015 |
| CN | 104737161 A | 6/2015 |
| CN | 105493079 A | 4/2016 |
| CN | 106341507 A | 1/2017 |
| EP | 2 950 520 A1 | 12/2015 |
| KR | 10-1058660 B1 | 8/2011 |
| KR | 10-2016-0123074 A | 10/2016 |
| MX | 2016003888 A | 4/2017 |
| WO | 2015/000138 A1 | 1/2015 |

OTHER PUBLICATIONS

Extended European Search Report dated Mar. 31, 2020, issued in European Patent Application No. 18892033.4.
International Search Report dated Apr. 19, 2019, issued in International Patent Application No. PCT/KR2018/016536.
European Office Action dated Sep. 4, 2020, issued in European Patent Application No. 18892033.4.
Chinese Office Action dated Nov. 6, 2020, issued in Chinese Patent Application No. 201880082700.6.
Chinese Office Action dated May 7, 2022; Chinese Patent Application No. 202110936092.4.
European Office Action dated Apr. 19, 2022; European Patent Application No. 18 892 033.4-1218.

* cited by examiner

FIG. 5
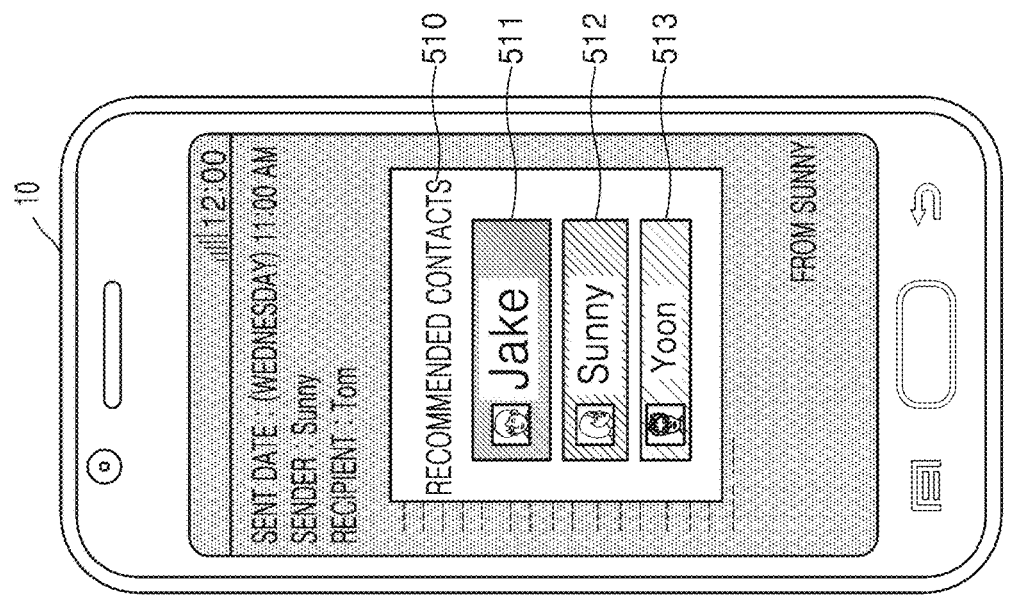
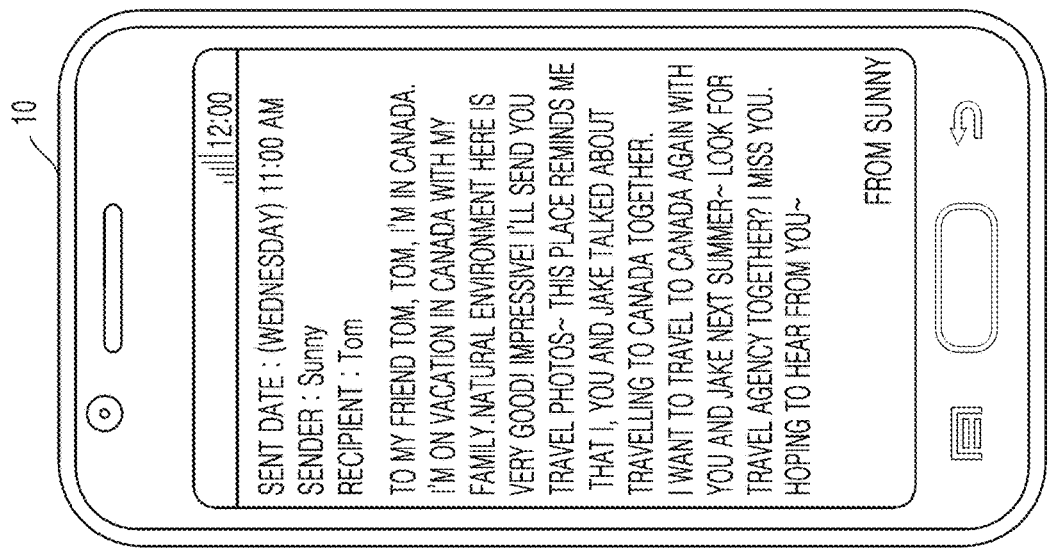

DEVICE AND METHOD FOR
RECOMMENDING CONTACT
INFORMATION

CROSS-REFERENCE TO RELATED
APPLICATION(S)

This application is based on and claims priority under 35 U.S.C. § 119(a) of a Korean patent application number 10-2017-0178737, filed on Dec. 22, 2017, in the Korean Intellectual Property Office, and of a Korean patent application number 10-2018-0164959, filed on Dec. 19, 2018, in the Korean Intellectual Property Office, the disclosure of each of which is incorporated by reference herein in its entirety.

BACKGROUND

1. Field

The disclosure relates to methods and devices for recommending contact information. More particularly, the disclosure relates to a method and device for recommending contact information and a contact method using a user's current context information.

2. Description of Related Art

An artificial intelligence (AI) system is a computer system capable of achieving a level of human intelligence and enabling a machine to self-learn, self-determine, and become smarter, unlike existing rule-based smart systems. The more an AI system is used, the further a recognition rate improves, and thus, a user's preference can be more accurately understood. Accordingly, the existing rule-based smart systems are gradually being replaced with deep-learning-based AI systems.

AI technology consists of machine learning (deep learning) and element techniques using machine learning.

Machine learning is algorithm technology for self-sorting/learning features of input data. The element techniques are techniques for imitating the human brain's cognitive function, determination function, etc. using a machine learning algorithm such as deep learning, and may be classified into technical fields, for example, including linguistic comprehension, visual comprehension, inference/prediction, knowledge representation, operation control, etc.

Various fields to which AI technology is applicable will be described below. Linguistic comprehension is a technique for identifying and applying/processing human language/characters and includes natural-language processing, machine translation, a dialogue system, question and answer, voice recognition/synthesis, etc. Visual compression is a technique for identifying and processing an object in terms of human perspectives and includes object recognition, object tracing, video searching, recognition of human beings, scene comprehension, understanding of a space, video enhancement, etc. Inference/prediction is a technique for judging and logically reasoning information and making predictions, and includes knowledge/probability-based inference, optimizing predictions, preference-based planning, recommendation, etc. Knowledge representation is a technique for automatically processing human experience information on the basis of knowledge data, and includes knowledge construction (data creation/classification), knowledge management (data utilization), etc. The operation control is a technique for controlling self-driving of a vehicle and a robot's movement and includes motion control (navigation, crash, driving), manipulation control (behavior control), etc.

With the development of communication technology, various functions for communicating with people have been provided to user terminals, and thus not only the number of contacts for making voice calls, sending text messages, etc. but also the number of contacts for communication through a messenger, e-mail, a social networking service (SNS), etc. has increased.

It is difficult to memorize a large number of contacts for various types of communication channels. For user convenience, each communication channel program provides a function of recommending contacts in various ways. However, in most existing methods of recommending contacts, contacts are simply recommended based on the number of calls and the duration of each of the calls. Accordingly, there is a growing need to subdivide and recommend contacts according to a user's context.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for recommending contacts, based on a user's context information and a relationship with the user.

Additional aspects will be set forth in part in the description which follows and, in part, will be apparent from the description, or may be learned by practice of the presented embodiments.

In accordance with an aspect of the disclosure, a device is provided. The device includes a processor and a memory configured to store instructions executable by the processor. The processor is configured to execute the instructions to extract context information from displayed data based on an application which is being executed by the device, identify an identifier from the context information, search for at least one recommended contact related to the identifier based on the identifier and a relation graph obtained by inputting information regarding a communication between a plurality of users into a first training model for determining an association between the plurality of users, identify a priority of the at least one recommended contact, and control to display the at least one recommended contact according to the priority.

In accordance with another aspect of the disclosure, a method is provided. The method includes extracting context information from displayed data based on an application that is being executed by the device, identifying an identifier from the context information, searching for at least one recommended contact related to the identifier based on the identifier and a relation graph obtained by inputting information regarding a communication between a plurality of users to a training model for determining an association between the plurality of users, determining a priority of the at least one recommended contact, and displaying the at least one recommended contact according to the priority.

In accordance with another aspect of the disclosure, a non-transitory computer-readable recording medium is provided. The non-transitory computer-readable recording medium having recorded thereon a program which, when executed by a computer, performs the method described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a diagram illustrating a method of estimating a recommended contact from a user's mail by using a user relation graph, the method being performed by a device, according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, it will be understood that when an element is referred to as being "connected to" another element, the element may be directly connected to another element or be electrically connected to another element while having intervening elements therebetween. It will be further understood that the terms "comprises" and/or "comprising," when used in this specification, specify the presence of stated elements, but do not preclude the presence or addition of one or more other elements. As used herein, the term "and/or" includes any and all combinations of one or more of the associated listed items. Expressions such as "at least one of," when preceding a list of elements, modify the entire list of elements and do not modify the individual elements of the list.

Embodiments will be described in greater detail with reference to the accompanying drawings.

FIG. 1

Figure 1:
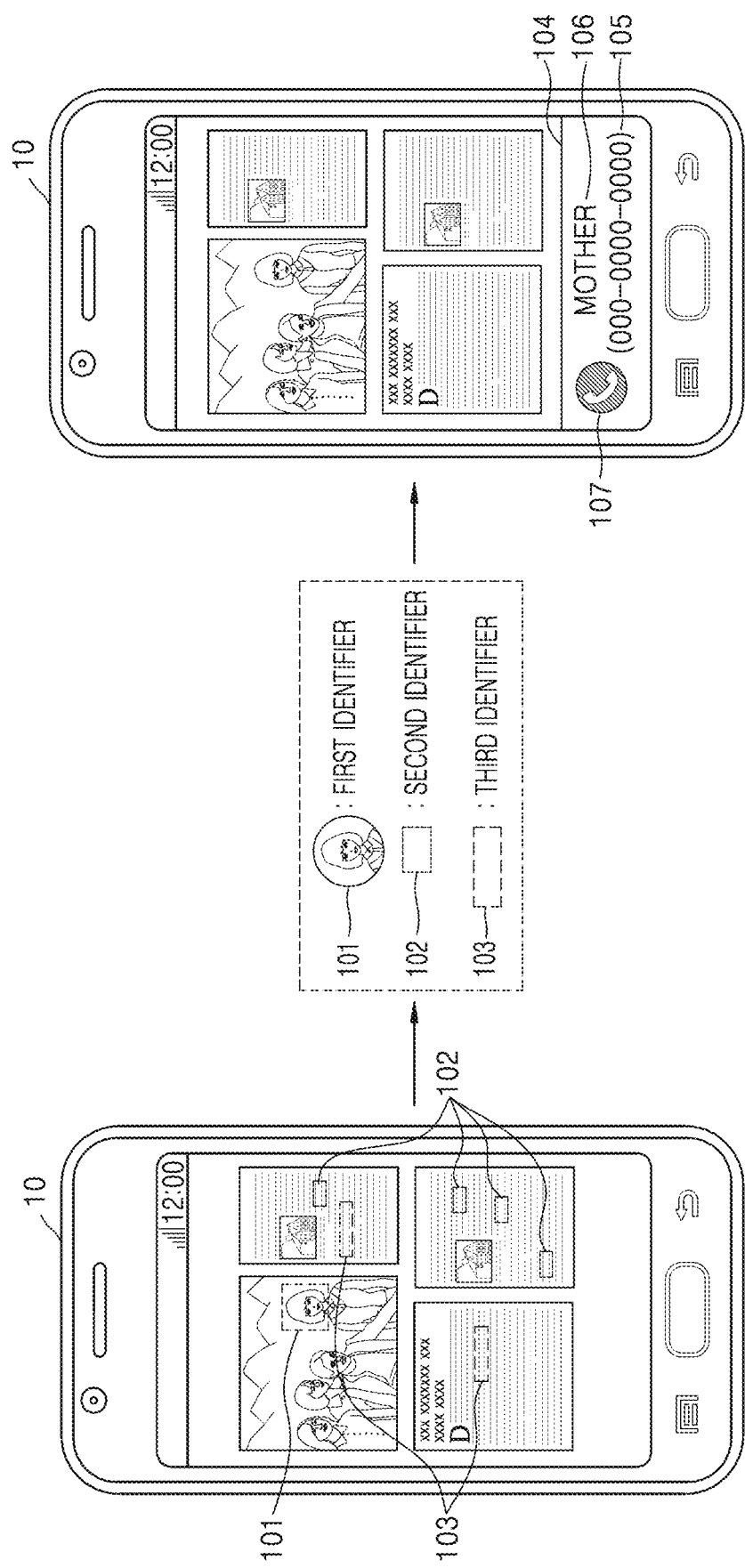
FIG. 1 is an overview diagram of a method of recommending contacts performed by a device, according to an embodiment of the disclosure.

FIG. 1 is an overview diagram of a method of recommending contacts, the method being performed by a device, according to an embodiment of the disclosure.

Referring to FIG. 1, in one embodiment, a device 10 may identify at least one identifier, e.g., a first identifier 101, a second identifier 102, and a third identifier 103, from context information of an application that is being executed in the device 10.

In one embodiment, an identifier may be a keyword of text or a facial characteristic point identified through face recognition. The device 10 may identify at least one identifier and group identifiers that are related to each other.

In one embodiment, the device 10 may extract, as an identifier, a word used a certain frequency or greater in context information by using a language processing algorithm. In this case, the identifier may be a keyword.

In one embodiment, the device 10 may obtain a keyword by maintaining a map between two or more dictionaries such that a word or phrase of one dictionary is mapped to another word or phrase of another dictionary. In one embodiment, when there is an association between a word or phrase in one dictionary and a word or phrase in another dictionary, the device 10 may obtain keywords interchangeable with each other by using a map. The association may represent a method related to a pair of nodes corresponding to a pair of pieces of data. In various embodiments, the association may be represented by a predicate with a pair of pieces data or nodes as a subject and an object, respectively. In one embodiment, an association between two or more dictionaries may include, but is not limited to, the same relation or an inclusion relation. For example, the words "Korea" and "KR" that are in the same relation are interchangeable with each other unless the context requires otherwise. The words "sports" and "basketball" that are an inclusion relation are interchangeable with each other unless the context requires otherwise. The dictionary may be a language dictionary, a search context dictionary, an AdWords dictionary, a user intent map, or a user defined dictionary. The language processing algorithm may be, for example, a neuro-linguistic programming algorithm, a natural language processing algorithm, or the like, or may include various algorithms for analyzing and processing human languages, or a combination thereof. In one embodiment, the device 10 may extract, as an identifier, a face detected at a certain frequency or greater from the context information by using a face recognition algorithm. In this case, the identifier may be a facial characteristic point.

The device 10 may detect a characteristic point on a face region by using coordinate information corresponding to the face. For example, the characteristic point on the face region may be detected using coordinates of the locations of the eyes, nose, mouth, and ears of the face. In one embodiment, the face recognition algorithm may include, for example, an algorithm using a combination of a dynamic compensatory fuzzy neural network (DCFNN) and an Eigen face-linear determinant analysis (LDA), and a combination of algorithms.

In one embodiment, the device 10 may obtain context information of an application that is being currently executed. In one embodiment, the application may include mail, a social network service (SNS), text, a photo album, a diary, news, or the like but the type of the application is not limited thereto. In one embodiment, the context information may include a photograph, a picture, text, a moving picture, animation, or the like included in the application. Alternatively, in one embodiment, the context information may include current time, a running time of the application, the properties of the application, the type of the application, or the like.

In one embodiment, the device 10 may obtain the context information from data displayed thereon through execution of an application in the device 10. In one embodiment, the device 10 may obtain the context information, based on text displayed thereon. For example, the text displayed on the device 10 may include at least one among the title of an email displayed thereon through execution of an email application, the body of the email, a sender, and a referrer. In one embodiment, the device 10 may obtain the context information by using different weights according to a field including text. For example, the device 10 may obtain the context information by assigning a largest weight to text included in the title of the email and a smallest weight to text included in the referrer. Alternatively, the device 10 may obtain the context information by classifying text into different categories according to a field including the text. For example, the device 10 may obtain the context information by classifying the text included in the title of the email into a 'purpose' category and text included in the sender into a 'person' category.

Alternatively, the device 10 may obtain the context information, based on an image displayed thereon. For example, the image displayed on the device 10 may include at least one among a moving image, a still image, and a representative image displayed for a certain time through execution of a moving picture application. In one embodiment, the device 10 may obtain the context information using different weights according to a field including an image. Alternatively, the device 10 may obtain the context information by classifying text into different categories according to a field including an image. In one embodiment, the device 10 may analyze the context information, extracts at least one identifier, e.g., at least one keyword and at least one facial characteristic point, and identify a tendency of the context information by using the extracted identifier. For example, when the first identifier 101 is a 'mother's face,' the second identifier 102 is a 'family trip,' and the third identifier 103 is 'joy,' the device 10 may identify that the tendency of the context information currently being executed is a 'pleasant family trip.' In one embodiment, the device 10 may process a plurality of identifiers into text representing a time-series operation to determine the tendency of the context information. For example, the device 10 may generate text such as 'a user has searched for famous tour places in Canada,' 'the user has searched for restaurant information in Canada,' and 'the user went to play basketball with John and Tom,' based on the plurality of identifiers, and identify the tendency of the context information, based on the generated text.

In one embodiment, the device 10 may search for a recommended contact related to an identifier. The device 10 may search for a plurality of recommended contacts related to a plurality of identifiers. The device 10 may use a training model based on a deep neural network technique to search for a recommended contact related to at least one identifier. The device 10 may search for a recommended contact related to one identifier or a combination of identifiers. For example, when the first identifier 101 is a 'mother's face,' the second identifier 102 is a 'family trip,' and the third identifier 103 is 'joy,' the device 10 may search for family contacts as recommended contacts.

In one embodiment, the device 10 may identify priority of searched for at least one recommended contact. In one embodiment, the device 10 may identify priority of a recommended contact in consideration of a frequency of contact with the recommended contact, contact time, a contact method, a contact period, etc.

In one embodiment, the device 10 may display a recommended contact on a portion of a display. In one embodiment, the device 10 may display a recommended contact in a pop-up window, on a separate window, or in the form of a message.

In one embodiment, the device 10 may display a recommended contact in a pop-up window 104 at a lower end of a screen. In one embodiment, the pop-up window 104 may include identification (ID) information 106 of the recommended contact, e.g., a name of the recommended contact stored. In one embodiment, the pop-up window 104 may include an icon 107 of a contact method for the recommended contact. In one embodiment, detailed information 105 of the recommended contact may be displayed in the pop-up window 104. The detailed information 105 of the recommended contact may include a telephone number when the contact method is a telephone call, and may include ID information when the contact method is an SNS.

FIG. 2

Figure 2:
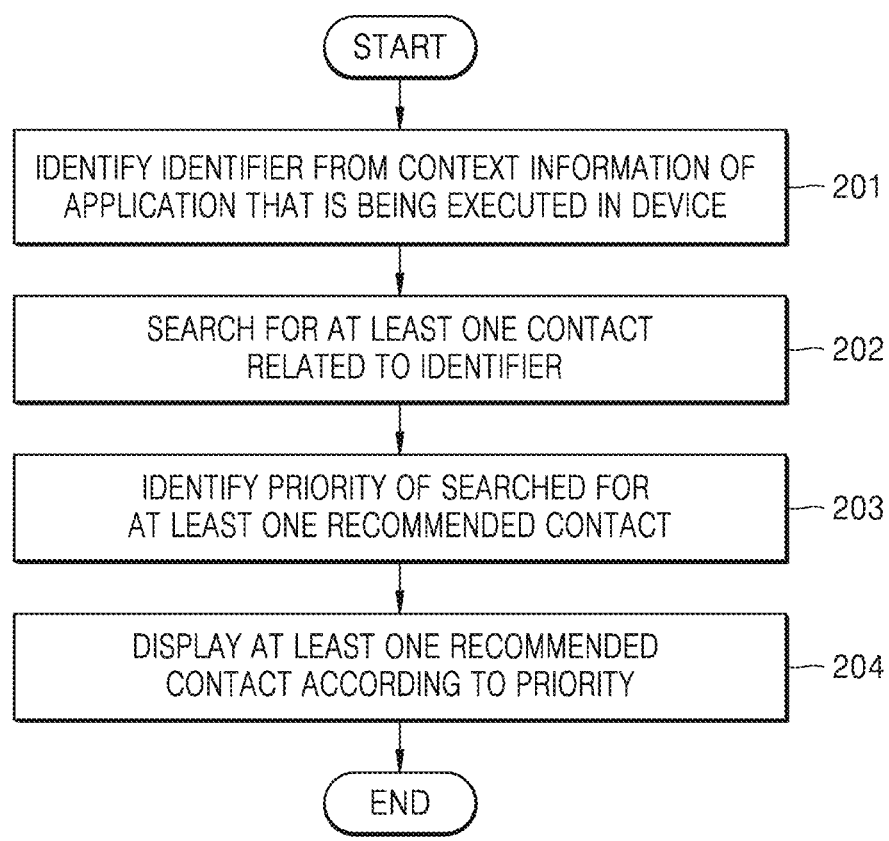
FIG. 2 is a flowchart of a method of operating a device, according to an embodiment of the disclosure.

FIG. 2 is a flowchart of a method of operating a device according to an embodiment of the disclosure.

Referring to FIG. 2, in operation 201, in one embodiment, the device 10 may identify an identifier from context information of an application that is being executed. In one embodiment, the device 10 may identify at least one identifier in context information by using a language processing algorithm or a face recognition algorithm. In one embodiment, an identifier may be identified using a word, a synonym, a similar word, etc. detected at a certain frequency or greater.

In operation 202, in one embodiment, the device 10 may search for at least one contact related to the identifier. In one embodiment, the device 10 may obtain an artificial intelligence (AI) training model, based on a result of learning a relationship between the identifier and a plurality of pieces of contact information (graph learning) using information regarding a history of use of the identifier for a certain time period.

For example, the device 10 may process a plurality of identifiers into text representing a time-series operation. For example, the device 10 may create text such as 'a user has searched for famous tour places in Canada,' 'the user has searched for restaurant information in Canada,' and 'the user went to play basketball with John and Tom,' based on the plurality of identifies.

In one embodiment, the device 10 may learn a relation between a user and other users or a relation between another user and other users by using information regarding communication between the user and the other users, for example, contact owners. The information regarding the communication may include the frequency of contact between a plurality of users, contact times, contact places, the intimacy of contact, a common interest, intimacy, etc. The device 10 may be trained by inputting the above-described communication information into a first training model for determining an association between the plurality of users, and may generate a relation graph based on a result of training.

For example, the device 10 may generate a relation graph trained to match other users who have very frequently contacted the user in relation to a travel or foreign countries to the user in a 'travel' relationship. Alternatively, the device 10 may generate a relation graph trained to match other users who have very frequently contacted the user to do the same exercise to the user or a plurality of other users in an 'exercise' relationship. The relation graph will be described in more detail with reference to FIG. 4 below.

In one embodiment, the device 10 may identify an association between an identifier and the relation graph by using the AI training model, and search for a recommended contact, based on the identified association. In one embodiment, the AI training model may be learned to identify the association between the identifier and the relation graph by using text processed with the above-described time-series operation.

For example, when 'Canada' is extracted as an identifier, the device 10 may identify, as recommended contacts, contacts of other users matching the user in the 'travel' relationship in the relation graph by using an AI training model trained based on information regarding a history of use of 'Canada' together with 'travel.'

When 'John's face' is extracted as an identifier, the device 10 may identify, as recommended contacts, contacts of Tom matching John in a friendship relation in the relation graph by using an AI training model trained based on information regarding a history of use of 'John's face' together with 'Tom's face.' However, the above cases are merely examples, and an AI training model trained based on history information and a relation graph according to the disclosure are not limited thereto.

In one embodiment, the device 10 may search for at least one recommended contact by using the obtained AI training model.

In operation 203, in one embodiment, the device 10 may identify priority of the searched for at least one recommended contact. In one embodiment, the device 10 may identify priority of the at least one recommended contact, based on history information, such as the number of times of contact with the at least one recommended contact, a contact method, a contact period, and a relation with the identifier, and current information, such as current time, a current place, and information regarding an application that is being currently used.

In operation 204, in one embodiment, the device 10 display the at least one recommended contact according to the priority thereof. In one embodiment, the device 10 may display a plurality of recommended contacts simultaneously or sequentially. In one embodiment, the device 10 may display at least one connection method linked to the at least one recommended contact simultaneously or may display one of the at least one connection method at a time.

FIG. 3

Figure 3:
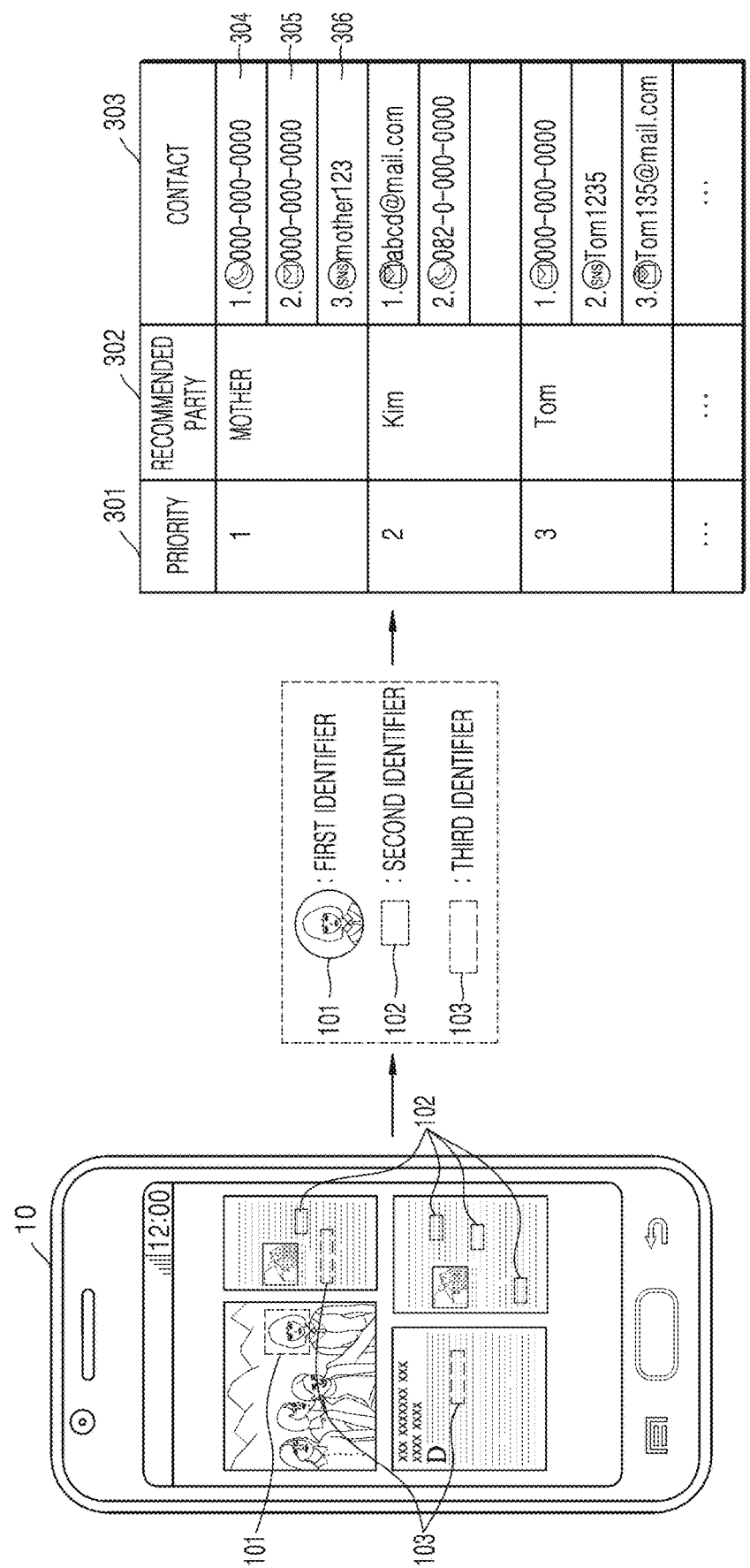
FIG. 3 is a diagram illustrating a method of recommending contacts by using identifiers, the method being performed by a device, according to an embodiment of the disclosure.

FIG. 3 is a diagram illustrating a method of recommending contacts by using identifiers, the method being performed by a device, according to an embodiment of the disclosure.

Referring to FIG. 3, in one embodiment, a device 10 may identify the first identifier 101, the second identifier 102, and the third identifier 103 in context information.

In one embodiment, the device 10 may search for at least one recommended contact by using an AI training model obtained based on a result of learning the relationship between an identifier and a plurality of pieces of contact information (graph learning).

In one embodiment, the device 10 may assign a weight to used contact information according to an application in which an identifier is used, a duration, time, frequency, and a location. Furthermore, the device 10 may identify at least one recommended contact, based on the assigned weight.

In one embodiment, the device 10 may collect history of use of at least one personal contact function, such as calls, text messages, messenger, e-mail, an SNS, etc. In one embodiment, the history of use may include dates and time when contact was made using each function. In addition, the history of use may include call times when a call function is provided, and may include details of contact using the remaining functions when the call function is not provided.

In one embodiment, the device 10 assigns a weight to used contacts by analyzing collected history of use of each function according to at least one criterion among a duration, time, and frequency. For example, a contact frequently used in recent days may be selected by assigning a weight of 2.0 to contacts used within last two days or a contact frequently used in a time zone in which a user has mainly communicated with intimate contacts may be selected by assigning a weight of 1.5 to contacts used from 6 pm to 12 pm.

In one embodiment, the device 10 may assign a weight to a contact that has exchanged words or emoticons expressing a predetermined emotion in history of use of personal contact functions, excluding a call function. For example, a contact with high intimacy may be selected by assigning a weight of 2.0 to e-mail contact history including a word "love" or emoticon therefor. In contrast, contacts related to loan advertisements or the like may be selected to have lower priority by assigning a weight of 0.1 to e-mail contact history including a word "loan."

In one embodiment, the device 10 may select at least one contact as a recommended contact by identifying priorities of contacts for each function.

In one embodiment, when one of recommended contacts corresponding to each function displayed on a screen is selected, the device 10 may activate a contact method linked to the selected contact. In addition, the device 10 may assign a weight to recommended contacts selected by a user so that frequently selected contacts may be more frequently recommended. In one embodiment, the device 10 may assign a weight to a contact selected a number of times which is greater than or equal to a predetermined number. Accordingly, the device 10 may achieve an effect of more activating the use of recommended contacts.

In one embodiment, the device 10 may identify recommended contacts, including recommended parties 302 and contacts 303. In one embodiment, the recommended parties 302 may be identification information such as persons or companies that are highly relevant to at least one of the first identifier 101, the second identifier 102, and the third identifier 103. In one embodiment, the device 10 may identify identification names identifying recommended contacts received from an internal repository, a cloud or a server and associated with a plurality of identifiers. In one embodiment, the identification names may include names stored in the device 10, company names searched for through a web, and identification information searched for through an SNS with respect to the recommended parties 302.

In one embodiment, the device 10 may search for at least one contact corresponding to the recommended parties 302. In one embodiment, contacts corresponding to the recommended parties 302 may include SNS addresses, available telephone numbers, mail addresses, SNS IDs, and the like. In one embodiment, the device 10 may identify priorities of the recommended parties 302 by reflecting information detected in association with at least one identifier. For example, when at least one identifier, e.g., the first, second, and third identifiers 101, 102, and 103, is related with a family trip, priority may be given to contacts of a family member "mother."

In one embodiment, the device 10 may identity priorities of the contacts 303 corresponding to the recommended parties 302. In one embodiment, the device 10 may identify priorities of the contacts 303 by reflecting information detected in association with at least one identifier. In one embodiment, the device 10 may identify priorities of the contacts 303 corresponding to the recommended parties 302, based on weights assigned according to a frequently used contact method, a recently used contact method, contact locations, etc. For example, when phone calls were made frequently with a "mother" who is one of the recommended parties 302 and whose priority 301 is number 1 about a family travel, phone calls may be determined to be a first-ranked contact method 304 linked to the mother. Similarly, text messages may be determined to be a second-ranked contact method 305, and an SNS may be determined to be a third-ranked contact method 306.

FIG. 4

Figure 4:
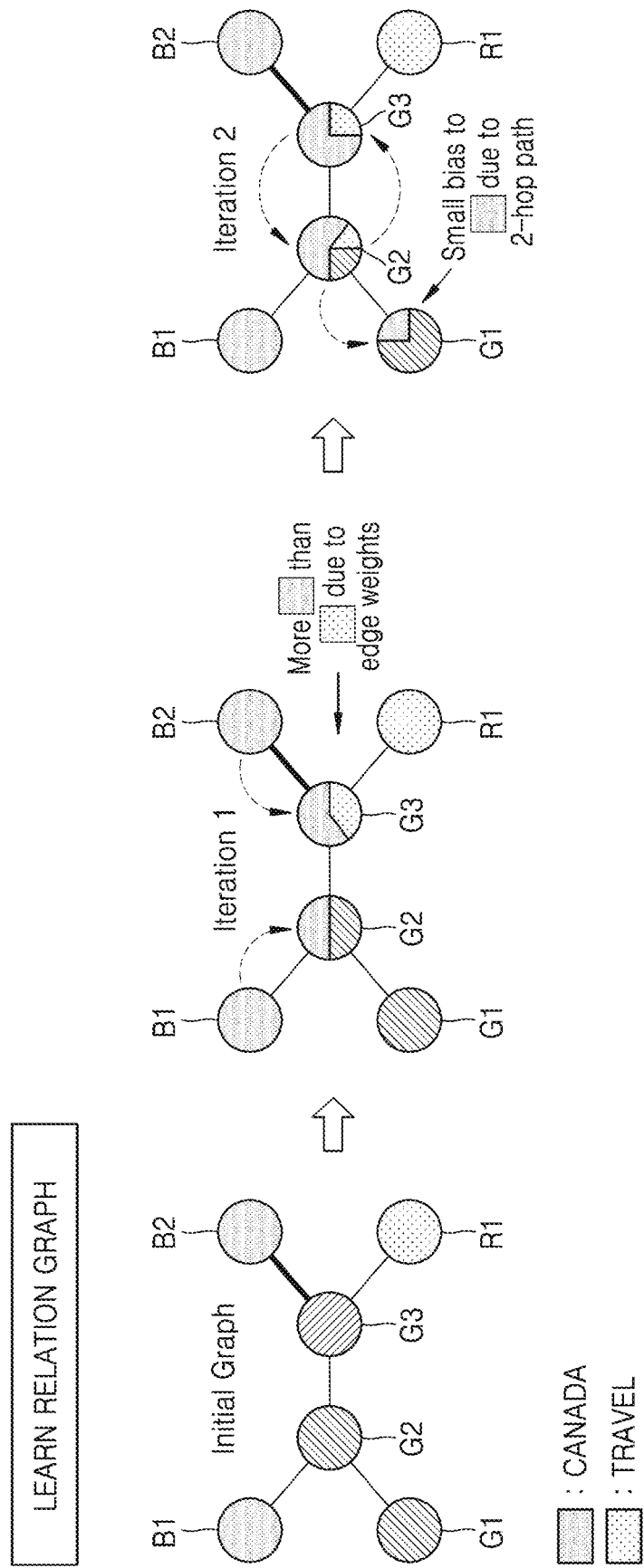
FIG. 4 is a diagram illustrating a method of creating a relation graph according to an intimacy between contacts, according to an embodiment of the disclosure.

FIG. 4 is a diagram illustrating a method of creating a relation graph according to intimacy between contacts, according to an embodiment of the disclosure.

In one embodiment, the device 10 may learn the relationship between a user and other users, based on information regarding communication between the user and the other users. In one embodiment, the device 10 may learn the relationship by using the frequency of contact with the other users, a contact time, contact locations, the intimacy of the contact, common interests, intimacy, etc., and may create a relation graph based on a result of learning the relationship.

In one embodiment, the device 10 may reflect, into an initial graph, unlabeled information such as information newly disclosed through an SNS, mail, phone calls, etc. new contact information, and the like, based on labeled information such as previously stored other users' names, contacts, groups to which the other users belong, the frequency of contact, etc.

Referring to FIG. 4, round nodes denote persons. The locations and colors of the nodes may be data fields indicating similarity, interest, intimacy, etc. between the nodes. In one embodiment, the nodes may include a plurality of patterns each occupying a certain area. The shapes of the patterns may represent different data fields, and the areas occupied by the patterns in the nodes may represent a relative ratio between values of the data fields. In one embodiment, for example, in a first graph of FIGS. 4, B1 and B2 have a common interest in a common data field, i.e., "Canada." In the relation graph, R1 is interested in a data field, i.e., "travel."

In one embodiment, each line connecting the nodes may represent a relation between users corresponding to the nodes. A thickness of each line connecting the nodes may represent the strength of the relationship between the nodes. The strength of the relationship may include intimacy, similarity, whether each of the nodes belongs to a public group, and so on. For example, in the first group of FIG. 4, the strength of the relationship between B2 and G3 may be greater than that of the relationship between G3 and G2. In the graph of FIG. 4, the thickness of each line connecting the nodes may be a value indicating the strength of a relation standardized based on the data fields included in the respective nodes. However, the thickness of each line is merely an example, and in the graph of FIG. 4, each line connecting the nodes may be provided for one of the data fields. For example, B2 and G3 may be connected by a line having a first thickness, based on the 'travel' data field, and may be connected by a line having a second thickness, based on the 'Canada' data field. Alternatively, each line connecting the nodes may represent a field indicating an association as well as the value. For example, a field indicating an association represented by a line connecting B2 and G3 may include the same relation sameAs, a membership relationship type, an inclusion relation subClassOf, or the like.

In one embodiment, the device 10 may create an initial graph using information obtained based on predefined persons and communication information. In the first graph of FIG. 4, G1, G2 and G3 have not yet been learned.

Through a first training, the device 10 may train G2, based on the contents of conversation, messages, or mail between B1 and G2. Referring to a second graph of FIG. 4, it is noted that a degree of similarity related to Canada with respect to G2 increases due to an influence by B1. At the same time, G3 may be trained, based on the relationship between B2 and R1. Since the strength of the relationship between G3 and B2 is greater than that of the relationship between G3 and R1, G3 may be trained by assigning a higher weight to Canada than to travel.

Referring to a third graph of FIG. 4, through a second training, the device 10 may learn the relation graph, based on information regarding communication with B1, B2, G1, G2, G3, and R1. In one embodiment, G2 and G3 may be trained, based on the strength of connection and information regarding communication in the device 10. In one embodiment, through the second training, the importance of interest in Canada and travel in G2 and G3 may be changed. Referring to the third graph of FIG. 4, a similarity in relation to travel is created in the case of G2, and the importance in interest in Canada becomes higher than that of interest in travel in the case of G3. In addition, G1 is connected to B1 via G2 and thus the importance of interest in Canada increases.

As described above, the relational graph between B1, B2, G1, G2, G3 and R1 may be trained through repeated training using information collected from the device 10 and information received from the outside. In one embodiment, when a user is writing a message about "Travel to Canada" by using the device 10, G2 and G3 may be searched for as recommended contacts, based on extracted identifiers 'Canada' and 'travel.'

FIG. 5

FIG. 5 is a diagram illustrating a method of estimating a recommended contact from a use's mail by using a user relation graph, the method being performed by a device, according to an embodiment of the disclosure.

Referring to FIG. 5, in one embodiment, the device 10 may provide a mail service to Tom who is a user. The device 10 may display mail received on Nov. 1, 2017, from Sunny who is traveling. In one embodiment, the device 10 may identify an identifier by analyzing the contents of the mail received from Sunny. For example, the device 10 may analyze text contained in the mail and identify a keyword such as "Canada," "travel," "Jake," "travel agency," "reply," or the like as an identifier.

In one embodiment, the device 10 may search for a recommended contact, based on at least one identifier. In one embodiment, the device 10 may search for a recommended contact by using a user relation graph created based on intimacy and a matter of interest between users.

In one embodiment, the device 10 may search for Sunny 502, Jake 503, Yoon 504, June 505, and a travel agency 506 by using a user relation graph created with respect to Tom 501. For example, Sunny 502 may have a common interest in Canada, and may have a common interest in travel with Jake 503.

In one embodiment, a data field of each user node may include intimacy, frequency of contact, each user's location, other interests, etc. For example, the device 10 may identify each user's location information by using the data field, based on contents of contact with other users, identification information of each user, state information displayed outside, and the like.

In one embodiment, the device 10 may identify a recommended contact appropriate for a current situation among searched for contacts. In one embodiment, the device 10 may identify a recommended contact, based on a current place and current time. A place and time taken into account by the device 10 may include a place and time related to both or each of a user and a contact owner. For example, the device 10 may recommend Yoon 504 who is in Korea rather than Sunny 502, considering that Sunny 502 is overseas.

Alternatively, the device 10 may identify a recommended contact, based on the contents of mail. For example, the device 10 may identify recommendation of Jake 503, based on mail received from Sunny 502 who is referring to a travel with Jake 503, and may identify recommendation of the travel agency 506 from the mail received from Sunny 502 who is referring to looking for a travel agency. Otherwise, the device 10 may identify recommendation of Sunny 502 from the mail received from Sunny 502 who is requesting a reply. Alternatively, the device 10 may identify a recommended contact by taking into account both contents of mail and location information. When it is determined that a user will leaving for Canada soon, the device 10 may recommend Jake 511 who lives in Canada which is a travel destination, prior to Yoon 504 who is in Korea.

In one embodiment, the device 10 may display the identified recommended contact on a screen in the form of a pop-up window 510. In one embodiment, the device 10 may simultaneously display a plurality of recommended contacts.

In one embodiment, the device 10 may differently display attributes of recommended contacts according to priorities given thereto. The device 10 may differently display sizes, colors, and degrees of deformation of the recommended contacts according to the priorities thereof. In one embodiment, the device 10 may display a size of Jake 511 who is first-ranked to be greater than those of other contacts, or may change a color of the Jake 51 so that Jake 511 may be highlighted.

In one embodiment, the device 10 may display Jake 511 who is first-ranked, Sunny 512 who is second-ranked, and Yoon 513 who is third-ranked such that contact methods therefor are linked thereto. For example, if a contact method for Sunny 512 who is second-ranked is determined to be mail, the device 10 may execute an application related to mail when Sunny 512 is selected in the pop-up window 510.

FIG. 6

Figure 6:
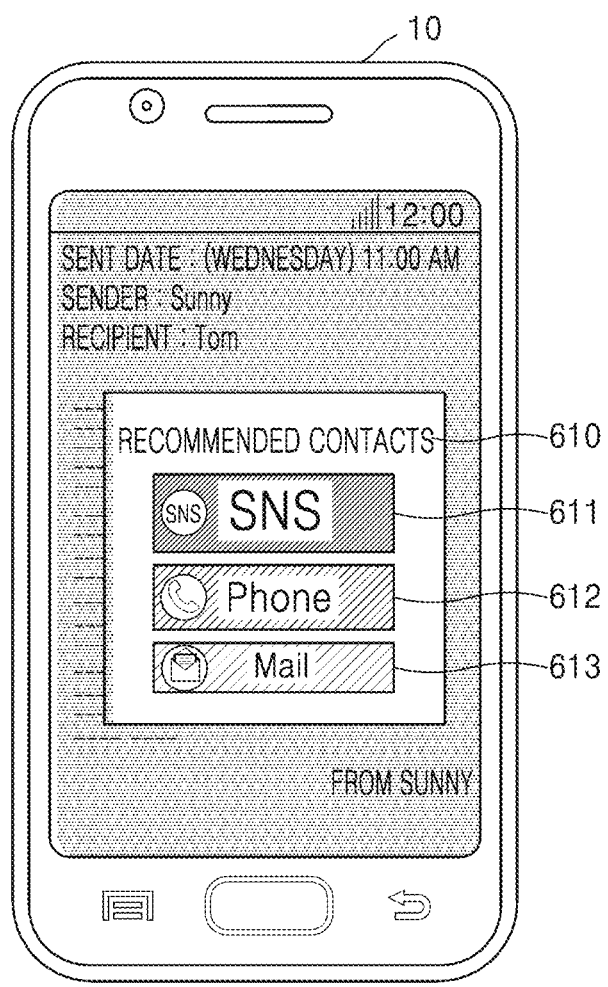
FIG. 6 is a diagram illustrating a method of displaying a contact method linked to a selected recommended contact, the method being performed by a device, according to an embodiment of the disclosure.

FIG. 6 is a diagram illustrating a method of displaying a contact method linked to a selected recommended contact, the method being performed by a device, according to an embodiment of the disclosure.

Referring to FIG. 6, in one embodiment, when one of a plurality of recommended contacts is selected by a user, the device 10 may display a contact method for the selected recommended contact.

In one embodiment, the device 10 may display Jake's contact by using a pop-up window 610. In one embodiment, the device 10 may display contact methods according to priorities thereof.

In one embodiment, the device 10 may obtain an AI training model, based on a result of learning the relationship between an application that is being executed and applications installed in the device 10 by using context information of the application that is being executed. In one embodiment, the context information of the application may include at least one, but is not limited to, among environmental information of the application, device status information of the application, state information of a user of the application, and application usage history information. The environmental information of the application is information regarding an environment within a certain radius during execution of the application, and may include, but is not limited to, for example, weather information, temperature information, humidity information, illuminance information, noise information, sound information, etc. The device state information of the application may include, but is not limited to, device mode information (e.g., a sound mode, a vibration mode, a silent mode, a power saving mode, a shutdown mode, a multi-window mode, an automatic rotation mode, etc.) during the execution of the application, device location information, device time information, activation information of a communication module (e.g., Wi-Fi ON, Bluetooth OFF, global positioning system (GPS) ON, near-field communication (NFC) ON, etc.), network connection status information, and the like. The user's state information is information regarding the user's movement, life pattern, etc., and may include, but is not limited to, information regarding the user's walking state, exercise state, driving state, sleeping state, mood state, etc. The application usage history information is information regarding the user's history of use of the application, and may include, but is not limited to, a history of a function executed in the application, the user's call history, the user's text message history, etc.

The device 10 may obtain an AI training model using context information of an application that is being executed therein, based on a result of learning a relation between the application that is being executed and either applications installed therein or applications executed in the device 10 under control outside. In one embodiment, an application installed or executed in a device may be an application associated with contact with another user. For example, the device 10 may be trained using the AI training model that when a user uses an SNS application outdoors, the user communicates with other users via the same SNS application at high frequency. Otherwise, the device 10 may be trained using the AI training model that when the user uses a mail server application at a company, the user communicates with other users via a phone application at high frequency. However, the above cases are merely examples, and a method of performing training using an AI training model of the disclosure learns is not limited thereto.

In one embodiment, the device 10 may obtain the AI training model by using context information of an application that is being executed and information regarding communication between a plurality of users, based on the application that is being executed, recommended contacts, and a relation between applications installed in the device 10.

In one embodiment, the device 10 may identify an application to be linked to at least one recommended contact by using the obtained AI training model. For example, the device 10 may be trained by the AI training model that if a user uses a mail server application at a company, when a recommended contact is a company employee, the user communicates with the company employee via an in-house messenger application. Otherwise, the device 10 may be trained by the AI training model that if the user uses the mail server application at the company, when a recommended contact is a customer, the user communicates with the customer via a phone application.

In one embodiment, the device 10 may link a plurality of contact methods to one recommended contact. The plurality of contact methods may include a plurality of applications. In one embodiment, the device 10 may search for a plurality of applications, based on the frequency of use of an application for communication with the recommended contact, an execution time, an execution place, an execution period, and main functions.

In one embodiment, the device 10 may apply information regarding communication between a plurality of users to an AI training model for determining a relation between recommended contacts and applications installed in the device 10. The device 10 may search for a plurality of applications associated with searched for recommended contacts by using the searched for recommended contacts and a learned AI training model.

For example, the device 10 may using the AI training model to search for an email application as an associated application when a recommended contact is a user with a 'business' data field. Otherwise, the device 10 may use the AI training model to search for an in-house messenger application as an associated application when a recommended contact is a user with a 'company employee' data field.

In one embodiment, the device 10 may identify priorities of the plurality of applications.

In one embodiment, the device 10 may simultaneously display a plurality of contact methods (e.g., SNS contact method 611, phone contact method 612, and mail contact method 613) linked to a selected recommended contact as illustrated in FIG. 6. The device 10 may differently set attributes of the plurality of contact methods according to priorities thereof. For example, when a contact method recommended for communication with Jake in a present situation is an SNS, the SNS contact method 611 may be displayed in the form of window larger than that of the phone contact method 612 or the mail contact method 613 or may be displayed in a color different from those of the SNS contact method 611 and the phone contact method 612. Alternatively, the device 10 may differently display attributes, such as size, color, shape, brightness, or a degree of flickering, of the plurality of contact methods according to the priorities thereof.

In one embodiment, the device 10 may execute a contact method selected by a user from among the plurality of contact methods. For example, when the user selects the SNS contact method 61, an SNS application that the user and Jake have most frequently used may be executed.

FIG. 7

Figure 7:
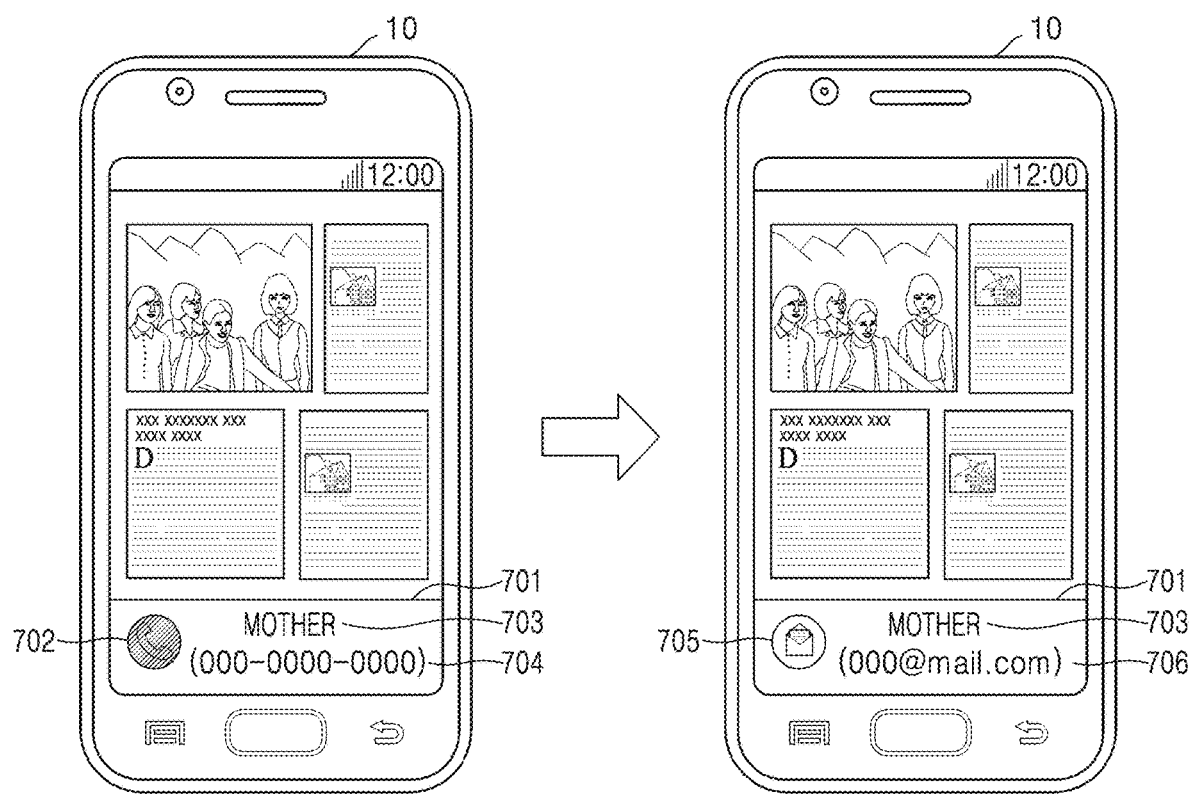
FIG. 7 is a diagram illustrating a method of displaying another contact method linked to a recommended contact when there is no connection to the recommended contact, according to an embodiment of the disclosure.

FIG. 7 is a diagram illustrating a method of displaying another contact method linked to a recommended contact when the recommended contact is not connected to, according to an embodiment of the disclosure.

Referring to FIG. 7, in one embodiment, the device 10 may display at least one recommended contact, based on contents of an application that is currently being executed.

In one embodiment, the device 10 may display a recommended contact to which a first-ranked application is linked. The device 10 may display a recommended contact on a predetermined region 701 of a screen. In one embodiment, the predetermined region 701 may be a lower portion, an upper portion, a center portion, a left portion, or a right portion of the screen.

In one embodiment, the device 10 may display an icon of an application linked to a recommended contact. For example, the device 10 may display an identification name 703 of the recommended contact, an icon 702 of the linked application, and a phone number 704 of the recommended contact in the predetermined region 701, i.e., the lower portion, of the screen.

In one embodiment, the device 10 may execute an application linked to a recommended contact selected in response to a user input to select a recommended contact. For example, when a user selects a recommended contact, the phone number 704 corresponding to the identification name 703 that is 'mother' may be dialed. In this case, the phone number 704 may be dialed using a function provided in the device 10 or a phone application.

In one embodiment, the device 10 may display a second-ranked application when communication using a first-ranked application for a recommended contact fails. For example, a mail service may be displayed as the second-ranked application when a phone connection to mother fails. An icon 705 of the second-ranked application and a mail address 706 and the identification name 703 of the recommended contact may be displayed on the screen of the device 10.

Alternatively, the device 10 may execute the second-ranked application as soon as communication using the first-ranked application fails. For example, a mail service of sending mail to mother may be executed when a phone connection to mother fails.

FIG. 8

Figure 8:
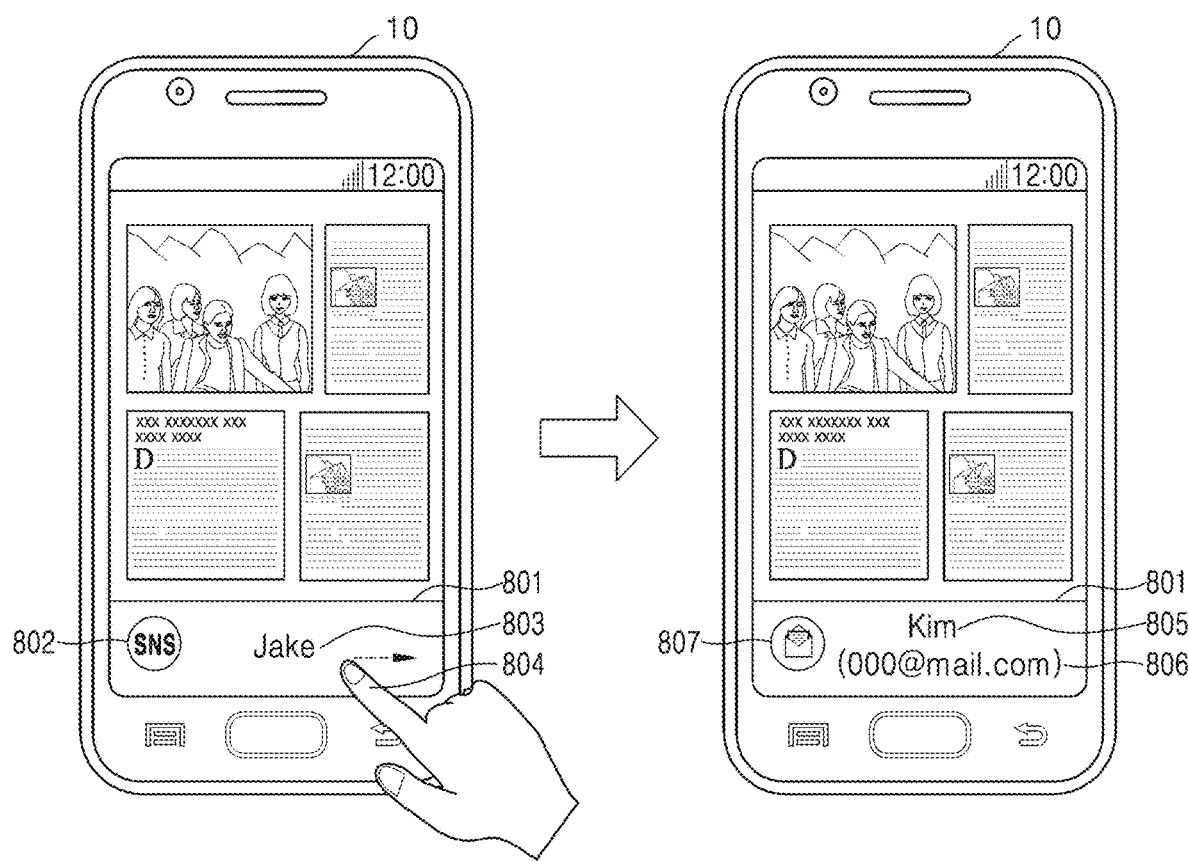
FIG. 8 is a diagram illustrating a method of recommending another recommended contact, according to an embodiment of the disclosure.

FIG. 8 is a diagram illustrating a method of recommending another recommended contact, according to an embodiment of the disclosure.

Referring to FIG. 8, in one embodiment, the device 10 may display a contact recommended based on user context on a lower region 801 of a screen thereof. The recommended contact may include Jake that is a user's identification name 803 and an icon 802 of an application linked to the recommended contact.

In one embodiment, the device 10 may receive a user input 804 requesting another recommended contact. For example, a user input instructing to touch the lower region 801 of the screen on which the recommended contact is displayed may be received. As another example, a user input may include tapping, touching and holding, double tapping, dragging, panning, flicking, dragging and dropping, or the like. A user input requesting another recommended contact may be designated by a user.

In one embodiment, the device 10 may display another recommended contact on the lower region 801 of the screen thereof, in response to the user input 804 requesting another recommended contact. For example, the device 10 may display an identification name 805 that is Kim, a mail icon which is an icon 807 of an application linked to the recommended contact, and Kim's mail address 806.

In one embodiment, priority of another recommended contact may be lower than that of a recommended contact that is being currently displayed on the screen.

In one embodiment, the device 10 may display either an advertisement or a coupon for an advertising product provided in a recommended contact when the recommended contact is displayed. In one embodiment, the device 10 may provide convenience of recommending a contact, enhance the convenience of living through providing an advertisement, and enhance a possibility of selecting a recommended contact.

FIG. 9

Figure 9:
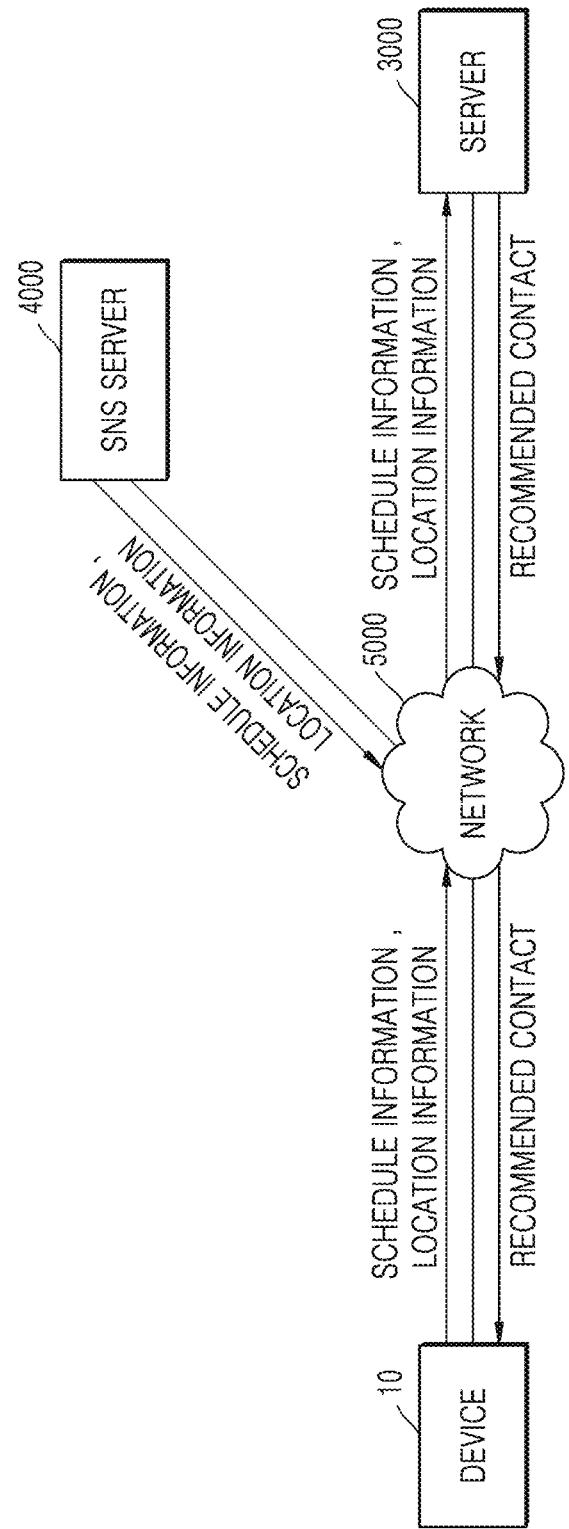
FIG. 9 is a diagram illustrating a method of estimating a recommended contact, based on schedule information and location information, according to an embodiment of the disclosure.

FIG. 9 is a diagram illustrating a method of estimating a recommended contact, based on schedule information and location information, according to an embodiment of the disclosure.

Referring to FIG. 9, in one embodiment, the device 10 may identify a recommended contact by using a server 3000 or an SNS server 4000 via a network 5000.

The device 10 may provide the server 300 with information related to communication established with other people by the device 10, and receive a list of recommended contacts from the server 3000 and display the list on a screen thereof.

In addition, the device 10 may provide the server 300 with information related to communication, including location information and time information, and current location information and a user's schedule information.

The server 300 may create a list of recommended contacts, based on schedule information, location information, and time information of the device 10 belonging to a user. Alternatively, the server 300 may create a list of recommended contacts, based on schedule information of the user of the device 10 and the user's acquaintance. In this case, the server 300 may receive the user's schedule information and the schedule information of the user's acquaintance from at least one of the device 10 and the SNS server 4000.

The network 5000 may be embodied as a wired network, such as a local area network (LAN), a wide area network (WAN) or a value-added network (VAN), or a wireless network, such as a mobile radio communication network or a satellite communication network. The network 5000 is a data communication network having a comprehensive meaning for allowing the network components illustrated in FIG. 9 to communicate smoothly with each other, and includes a wired Internet, a wireless Internet, and a mobile wireless communication network.

FIG. 10

Figure 10:
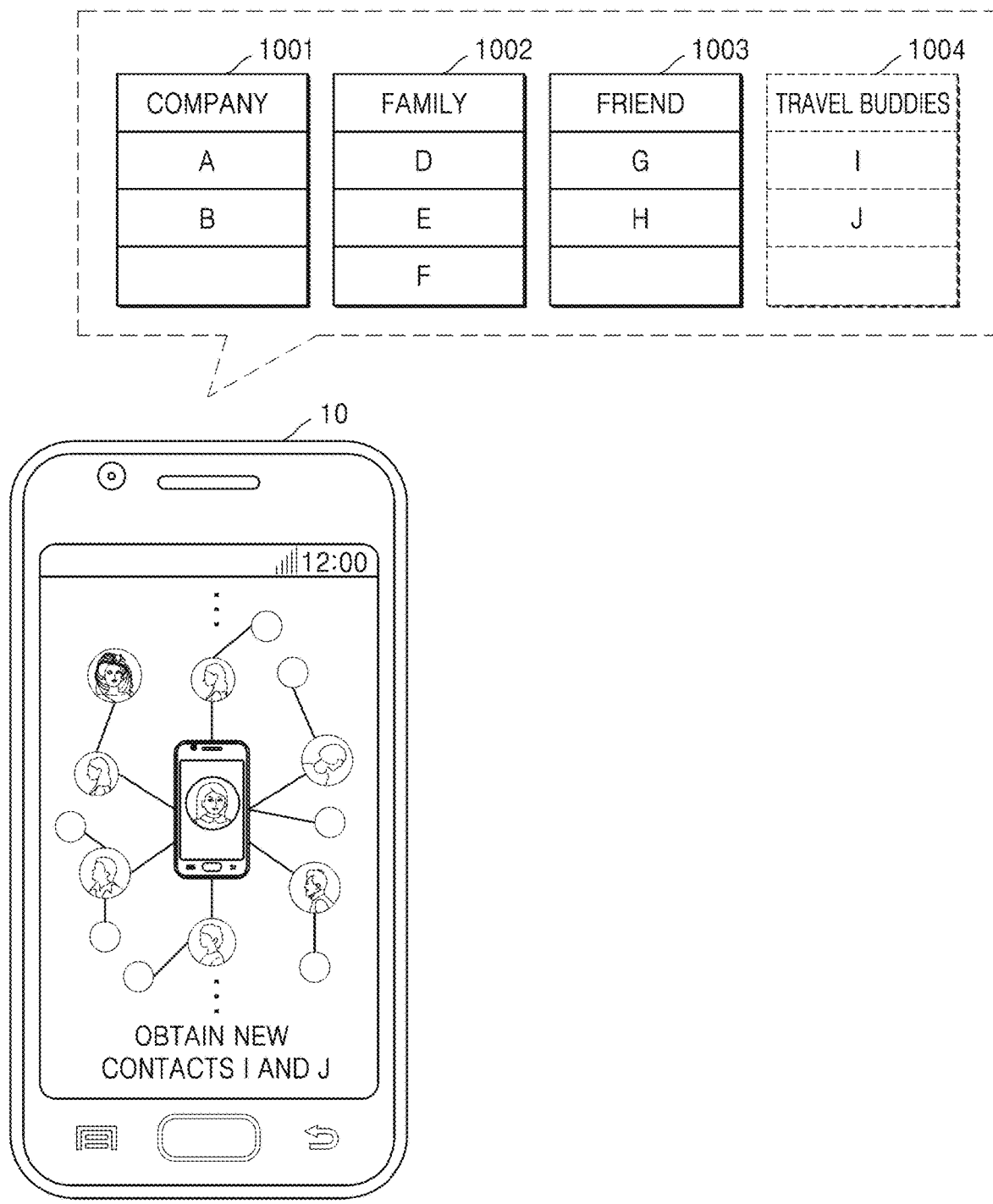
FIG. 10 is a diagram illustrating a method of creating an address book after new contacts are obtained, the method being performed by a device, according to an embodiment of the disclosure.

FIG. 10 is a diagram illustrating a method of creating an address book after new contacts are obtained, the method being performed by a device, according to an embodiment of the disclosure.

Referring to FIG. 10, in one embodiment, when new contact information is obtained through communication with another user, the device 10 may add the new contact information to an address book, based on intimacy, a matter of interest, a schedule, etc. of the new contact information. In one embodiment, the device 10 may create, modify, and delete address book groups, based on the relationship with other users.

In one embodiment, the device 10 may obtain new contacts I and J. The device 10 may identify the tendencies of the contacts I and J, the relationship between the contacts I and J and a user, and a public relationship, based on a user relation graph. For example, the device 10 may identify that the contacts I and J are contacts of people who the user met at a travel meeting. When address book groups previously stored in the device 10 include a company group 1001, a family group 1002 and a friend group 1003, a travel buddy group 1004 may be created to classify the contacts I and J. The device 10 may add the contacts I and J to the newly created travel buddy group 1004.

FIG. 11

Figure 11:
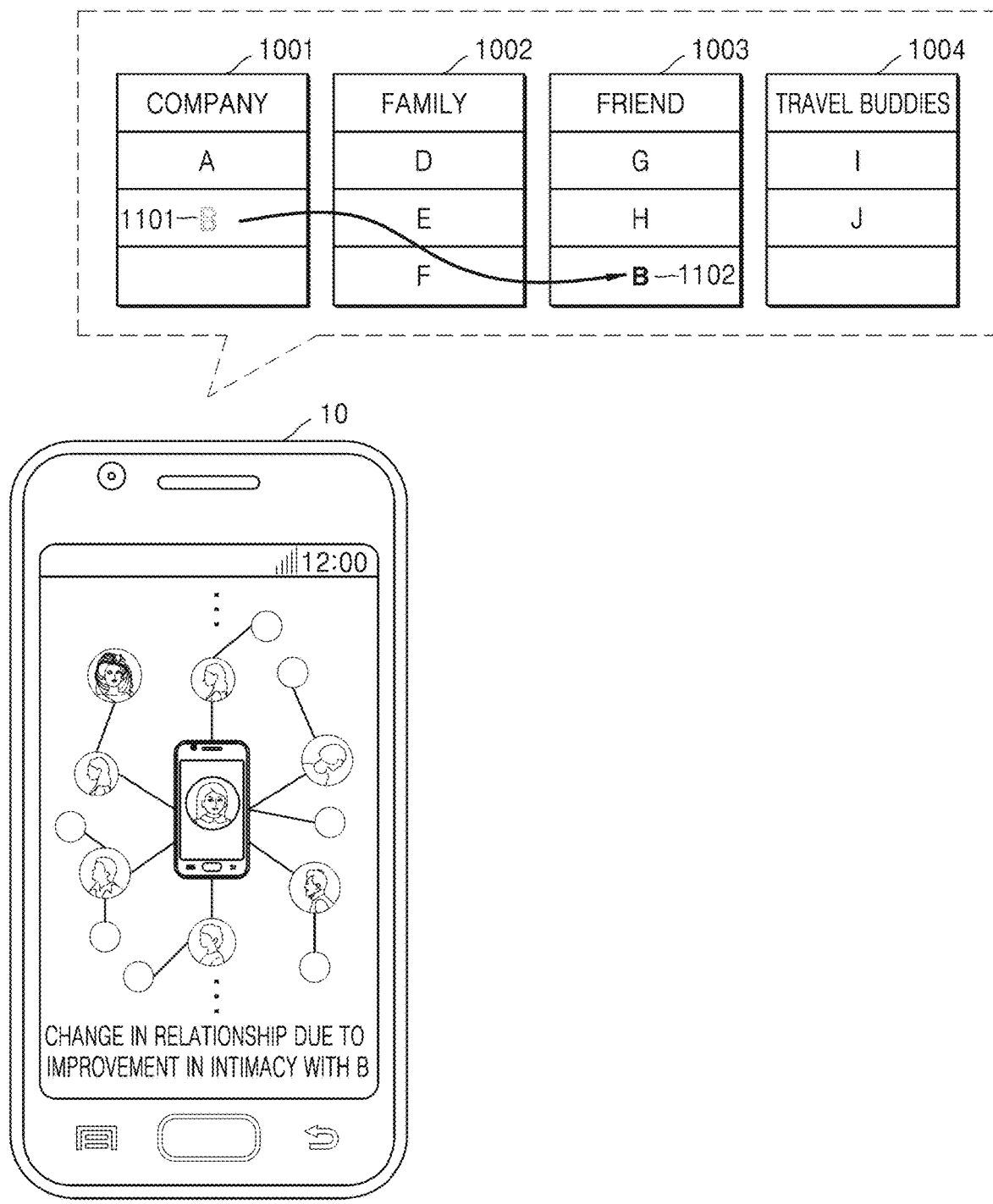
FIG. 11 is a diagram illustrating a method of updating an address book, based on a user relation graph, the method being performed by a device, according to an embodiment of the disclosure.

FIG. 11 is a diagram illustrating a method of updating an address book, based on a user relation graph, the method being performed by a device, according to an embodiment of the disclosure.

Referring to FIG. 11, in one embodiment, the device 10 may update a user relation graph, based on information regarding communication between a user and other users. In one embodiment, the device 10 may classify an address book, based on the updated user relation graph.

In one embodiment, the device 10 may identify that a personal relationship is built with a contact B 1101 classified to belong to the company group 1001, based on information regarding communication between the user and the contact B 1101. The device 10 may identify that the contact B 1101 is similar to users included in the friend group 1003. The device 10 may move the contact B 1101 from the company group 1001 to the friend group 1003. The user may identify a contact B 1102 belonging to the friend group 1003 in the address book of the device 10.

Accordingly, in one embodiment, the address book may be automatically arranged based on the information regarding communication between the user and the other uses.

FIG. 12

Figure 12:
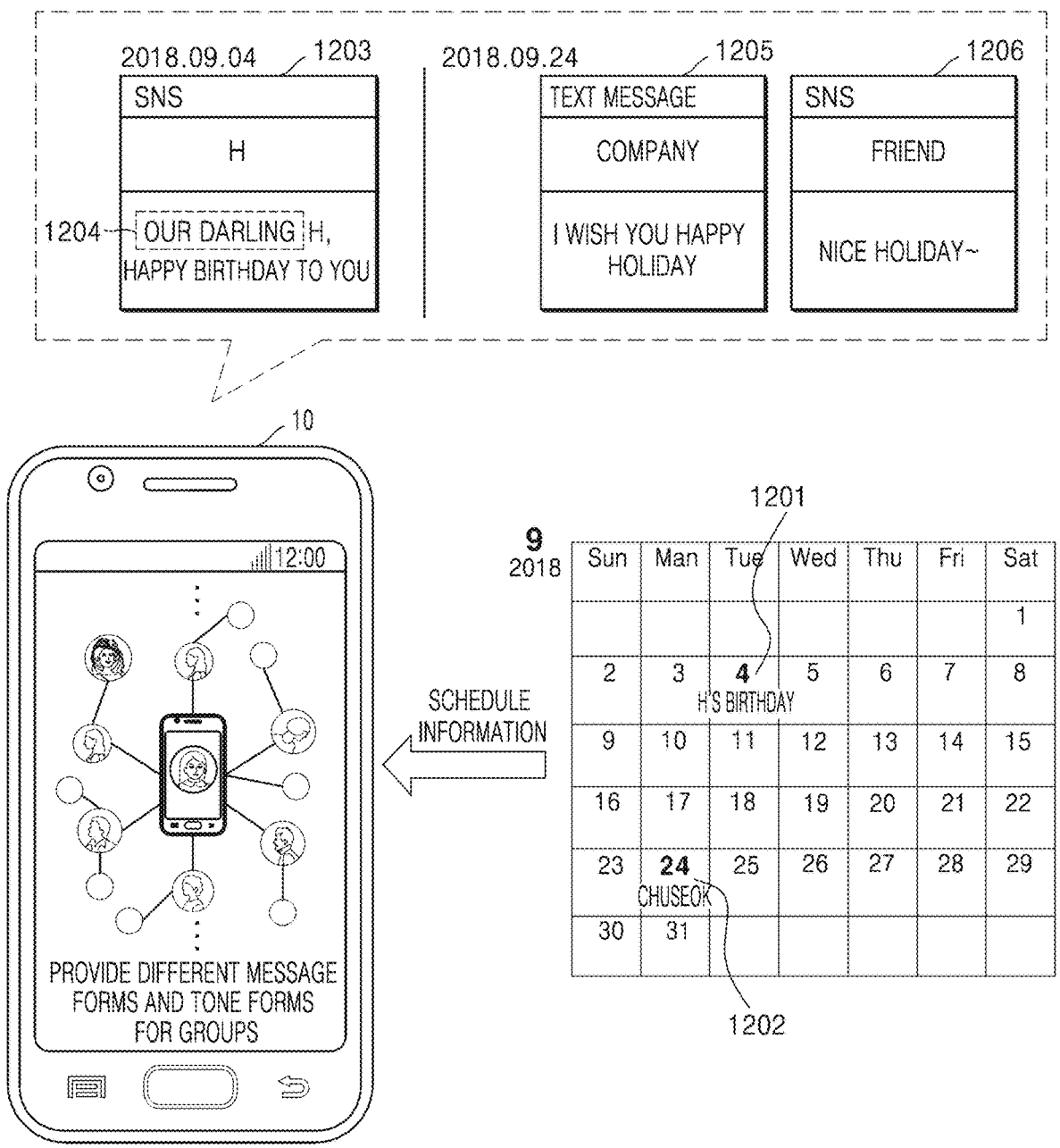
FIG. 12 is a diagram illustrating recommendation of a message, based on schedule information and group information, the recommendation being performed by a device, according to an embodiment of the disclosure.

FIG. 12 is a diagram illustrating recommendation of a message, based on schedule information and group information, the recommendation being performed by a device, according to an embodiment of the disclosure.

Referring to FIG. 12, in one embodiment, the device 10 may obtain a user's schedule information, and identify an application linked to a recommended contact, based on the obtained schedule information. For example, the device 10 may obtain information "Sep. 4, 2018 H's birthday" from the user's schedule information. The device 10 may recommend an H's contact on Sep. 4, 2018, as indicated at 1201. In this case, the device 10 may display that an SNS message 1203 is to be sent to H, reflecting a fact that a contact method frequently used to communicate with H is an SNS.

In one embodiment, the device 10 may provide a document form in which tone, grammar, and a sentence structure are predetermined, based on intimacy determined for a recommended contact. For example, the device 10 may provide, in the SNS message 1203, a phrase "our darling" 1204 based on a fact that a user frequently called H "our darling" in conversations with H and a phrase "happy birthday" based on a fact that September $4^{th}$ is H's birthday.

In one embodiment, the device 10 may provide a predetermined document form, based on group attributes of an address book. For example, the device 10 may obtain schedule information "Sep. 24, 2018 Chuseok." In one embodiment, the device 10 may transmit a message related to Chuseok greetings for each group on Sep. 24, 2018, as indicated at 1202. In one embodiment, the device 10 may send a company group a public tone message using a text message 1205. In another embodiment, the device 10 may send a friend group a friendlier message using an SNS message 1206 rather than the text message 1205 sent to the company group.

In one embodiment, the device 10 may automatically send a recommended message to a recommended contact, based on the schedule information.

Figure 13:
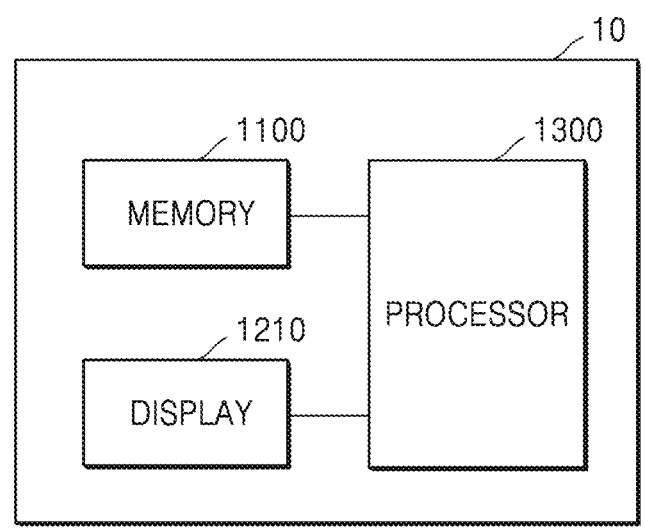
FIG. 13 is a block diagram of a device according to an embodiment of the disclosure.
Figure 14:
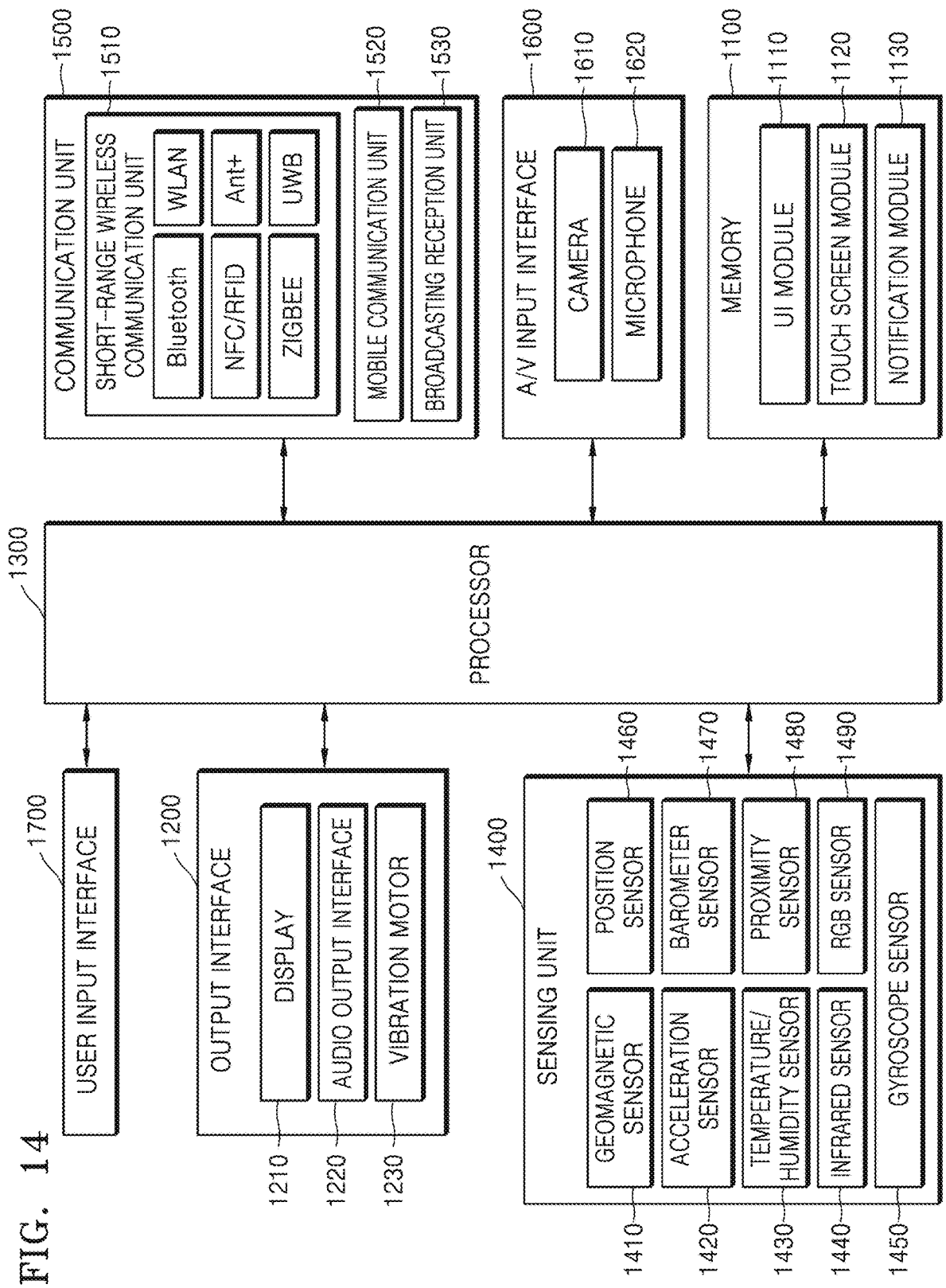
FIG. 14 is a detailed block diagram of the device according to an embodiment of the disclosure.

FIGS. 13 and 14

FIG. 13 is a block diagram of a device according to an embodiment of the disclosure.

FIG. 14 is a detailed block diagram of the device according to an embodiment of the disclosure.

Referring to FIG. 13, in one embodiment, the device 10 may include a memory 1100, a display 1210, and a processor 1300.

However, all of components illustrated in FIG. 13 are not essential components of the device 10. The device 10 may further include other components, as well as the components illustrated in FIG. 13, or may include only some of the components illustrated in FIG. 13.

Referring to FIG. 14, the device 10 according to an embodiment may further include an output interface 1200, a communication unit 1500, a sensing unit 1400, an audio/video (A/V) input interface 1600, and a user input interface 1700, as well as the memory 1100, the display 1210, a camera 1610, and the processor 1300.

The memory 1100 may store a program for processing and controlling performed by the processor 1300, and may store an image input to the device 10 or guide information output from the device 10. In addition, the memory 1100 may store information for determining whether or not guide information is output.

The memory 1100 may include at least one type storage medium among a flash memory type storage medium, a hard disk type storage medium, a multimedia card micro type storage medium, a card type memory (e.g., an SD or XD memory or the like), a random access memory (RAM), a static RAM (SRAM), a read-only memory (ROM), an electrically erasable programmable read-only memory (EEPROM), a programmable ROM (PROM), a magnetic memory, a magnetic disk, and an optical disc.

Programs stored in the memory 1100 may be classified into a plurality of modules, e.g., a user interface (UI) module 1110, a touch screen module 1120, a notification module 1130, etc., according to functions thereof.

The UI module 1110 may provide a specialized UI, a graphical user interface (GUI), or the like that are linked to the device 10 in units of applications. The touch screen module 1120 may sense a touch gesture on a user's touch screen, and transmit information regarding the touch gesture to the processor 1300. In one embodiment, the touch screen module 1120 may identify and analyze a touch code. The touch screen module 1120 may be configured as separate hardware including a controller.

The notification module 1130 may generate a signal to notify the occurrence of an event occurring in the device 10. Examples of an event occurring in the device 10 include call signal reception, message reception, key signal input, schedule notification, etc. The notification module 1130 may output a notification signal in the form of a video signal through the display 1210, output the notification signal in the form of an audio signal through an audio output interface 1220, or output the notification signal in the form of a vibration signal through a vibration motor 1230. For example, the notification module 1130 may generate a signal to output guide information, based on estimated lane information.

The output interface 1200 may output an audio signal, a video signal, or a vibration signal. The output interface 1200 may include the display 1210, the audio output interface 1220, and the vibration motor 1230.

The display 1210 displays and outputs information processed by the device 10. In detail, the display 1210 may output an image captured by the camera 1610. Furthermore, the display 1210 may combine guide information created by the processor 1300 with the captured image, and outputs a result of the combination.

In addition, the display 1210 may display a user interface to perform an operation, in response to a user input.

The audio output interface 1220 outputs audio data that is received from the communication unit 1500 or stored in the memory 1100. In addition, the audio output interface 1220 outputs a sound signal related to a function performed by the device 10 (e.g., call signal reception sound, message reception sound, or notification sound). For example, the audio output interface 1220 may output guide information, which is generated in the form of signal by the notification module 1130, in the form of sound signal, under control of the processor 1300.

Generally, the processor 1300 controls overall operations of the device 10. For example, the processor 1300 may execute programs stored in the memory 1100 for overall control of the user input interface 1700, the output interface 1200, the sensing unit 1400, the communication unit 1500, the A/V input interface 1600, etc. In addition, the processor 1300 may perform a function of the device 10 through execution of the programs stored in the memory 1100.

The sensing unit 1400 may sense a state of the device 10 or a state of the surroundings of the device 10 and transmit information regarding the sensed state to the processor 1300.

The sensing unit 1400 may include, but is not limited thereto, at least one among a geomagnetic sensor 1410, an acceleration sensor 1420, a temperature/humidity sensor 1430, an infrared sensor 1440, a gyroscope sensor 1450, a position sensor (e.g., a global positioning system (GPS)) 1460, a barometer sensor 1470, a proximity sensor 1480, and a red-green-blue (RGB) sensor 1490. Functions of these sensors would be intuitively inferred from the names of the sensors by those of ordinary skill in the art and thus are not described in detail here.

In one embodiment, the sensing unit 1400 may measure the distance between at least one object identified from a captured image and a vehicle.

The communication unit 1500 may include one or more components configured to enable the device 10 to communicate with another device (not shown) and a server (not shown). The other device may be either a computing device similar to the device 10 or a sensing device but is not limited thereto. For example, the communication unit 1500 may include a short-range wireless communication unit 1510, a mobile communication unit 1520, and a broadcasting reception unit 1530.

Examples of the short-range wireless communication unit 1510 may include, but are not limited to, a Bluetooth communication unit, a Bluetooth low energy (BLE) communication unit, a near-field communication unit, a WLAN (Wi-Fi) communication unit, a ZigBee communication unit, an infrared data association (IrDA) communication unit, a Wi-Fi direct (WFD) communication unit, an ultra-wideband (UWB) communication unit, an adaptive network technology (Ant+) communication unit, etc. For example, the short-range wireless communication unit 1510 may receive lane number information from a navigation device included in a vehicle through short-range wireless communication.

The mobile communication unit 1520 transmits a radio signal to or receives a radio signal from at least one among a base station, an external terminal, and a server in a mobile communication network. Here, the radio signal may be understood to include a voice call signal, a video call signal, or various types of data generated when text/multimedia messages are transmitted and received.

The broadcasting reception unit 1530 receives a broadcast signal and/or broadcast-related information from the outside via a broadcast channel. The broadcast channel may include a satellite channel, a terrestrial channel. In an embodiment, the device 10 may not include the broadcasting reception unit 1530.

The A/V input interface 1600 is configured to input an audio signal or a video signal, and may include the camera 1610, a microphone 1620, etc. The camera 1610 may obtain a video frame, such as a still image or a moving picture, through an image sensor in a video call mode or a shooting mode. An image captured via the image sensor may be processed by the processor 1300 or an additional image processor (not shown).

In one embodiment, the camera 1610 may capture an image of the outside of a vehicle. For example, the camera 1610 may capture an image of surroundings ahead of the vehicle while driving but embodiments are not limited thereto.

The microphone 1620 receives an external audio signal and converts the audio signal into electrical voice data. For example, the microphone 1620 may receive an audio signal from an external device or a user. The microphone 1620 may use various noise rejection algorithms to remove noise generated when the external audio signal is received.

The user input interface 1700 may be understood to mean a means through which a user inputs data for control of the device 10. Examples of the user input interface 1700 may include, but are not limited to, a key pad, a dome switch, a touch panel (a touch-type capacitive touch panel, a pressure-type resistive overlay touch panel, an infrared sensor-type touch panel, a surface acoustic wave conduction touch panel, an integration-type tension measurement touch panel, a piezo effect-type touch panel or the like), a jog wheel, a jog switch, etc.

FIG. 15

Figure 15:
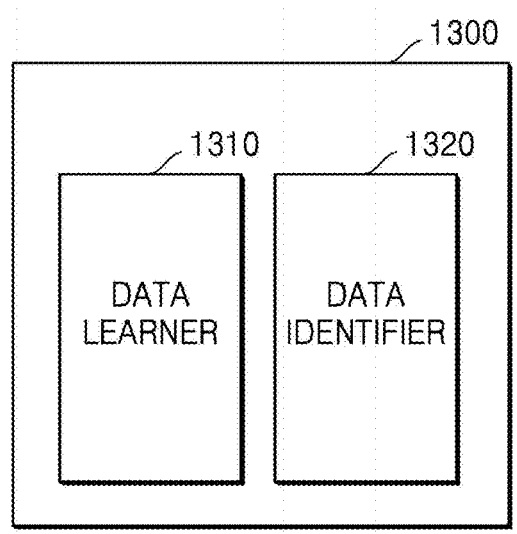
FIG. 15 is a block diagram of a processor according to an embodiment of the disclosure.

FIG. 15 is a block diagram of a processor according to an embodiment of the disclosure.

Referring to FIG. 15, in one embodiment, the processor 1300 may include a data learner 1310 and a data identifier 1320.

The data learner 1310 may learn a graph showing the relationship between a user and other users, based on information related to communication between the user and the other users. The data learner 1310 may learn a type of data to be used so as to increase an accuracy of the relation graph and whether the relation graph is to be expanded or not using the data. The data learner 1310 may obtain data to be used for the learning, and learn criterion for forming an appropriate relation network through learning of the relation graph by applying the obtained data to a data recognition model which will be described below.

In one embodiment, when there are a plurality of data recognition models previously built, the data learner 1310 may identify a data recognition model highly related to input training data and basic training data as a data recognition model to be learned. In this case, the basic training data may be previously classified according to types of data, and the data recognition model may be previously built for each of the types of data. For example, the basic training data may be previously classified by various criteria, such as a place in which the training data was created, time when the training data was created, a size of the training data, a genre of the training data, a creator of the training data, types of objects included in the training data, etc.

The data identifier 1320 may increase the accuracy of contact recommendation according to a situation, based on the user's relation graph. The data identifier 1320 may increase the accuracy of contact recommendation, based on a result of learning the relationship between an identifier of context and a plurality of pieces of contact information by using the learned data recognition model. The data identifier 1320 may obtain data according to criterion predetermined through learning and use the data recognition model with the obtained data as an input value to increase the accuracy of contact recommendation. A resultant value output using the data recognition model with the obtained data as an input value may be used to update the data recognition model.

At least one of the data learner 1310 and the data identifier 1320 may be manufactured in the form of at least one hardware chip and installed in a device. For example, at least one of the data learner 1310 and the data identifier 1320 may be manufactured in the form of dedicated hardware chip for artificial intelligence (AI) or may be manufactured as part of an existing general-purpose processor (e.g., a central processing unit (CPU) or an application processor (AP)) or part of a dedicated graphic processor (e.g., a GPU) and then be installed in various types of devices as described above.

In this case, the data learner 1310 and the data identifier 1320 may be installed in one device or different devices. For example, one of the data learner 1310 and the data identifier 1320 may be included in a device and the other may be included in a server. The data learner 1310 and the data identifier 1320 may be connected to each other via wire or wirelessly, and thus information regarding a model built by the data learner 1310 may be provided to the data identifier 1320 and data input to the data identifier 1320 may be provided as additional training data to the data learner 1310. At least one of the data learner 1310 and the data identifier 1320 may be embodied as a software module. When at one of the data learner 1310 and the data identifier 1320 may be embodied as the software module (or a program module including instructions), the software module may be stored in a non-transitory computer-readable recording media. In this case, at least one software module may be provided an operating system (OS) or through a certain application.

Alternatively, part of the at least one software module may be provided by the OS and the other part may be provided through the application.

The data identifier 1320 may be trained using a data recognition model used to determine a situation, based on training data. In this case, the data recognition model may be a model previously constructed. For example, the data recognition model may be a model previously constructed by receiving basic training data (e.g., a sample image, etc.). The data recognition model may be previously constructed in consideration of a field of application of recognition models, a purpose of learning, or the computer performance of a device, etc. The data recognition model may be, for example, a neural network-based model. For example, a model such as a deep neural network (DNN), a recurrent neural network (RNN), or a bidirectional recurrent deep neural network (BRDNN) may be used as the data recognition model but embodiments are not limited thereto.

In various embodiments, when there are a plurality of previously constructed data recognition models, the data learner 1310 may identify a data recognition model highly related to receive training data and basic training data to be a data recognition model to be learned. In this case, the basic training data may be previously classified according to types of data, and the data recognition model may be previously constructed according to the types of data. For example, the basic training data may be previously classified according to various criteria, e.g., a place in which the training data was created, time when the training data was created, a size of the training data, a genre of the training data, a creator of the training data, and the types of objects included in the training data.

An embodiment may be embodied in the form of a computer-readable recording medium storing instructions executable by a computer, such as computer-executable program modules. The computer-readable recording medium may be any available medium accessible by a computer, and examples thereof include a volatile recording medium, a nonvolatile recording medium, a separable storing medium, and a non-separable recording medium. Examples of the computer-readable recording medium may further include a computer storage medium and a communication medium. Examples of the computer-readable recording medium may include a volatile recording medium, a nonvolatile recording medium, a separable recording medium, and a non-separable recording medium manufactured by any method or technology to store information such as computer-readable instructions, data structures, program modules, or other data. Generally, examples of the communication medium include a computer-readable instruction, a data structure, a program module, or other data of a modified data signal, other transmission mechanisms, or any information transfer medium.

In the present disclosure, the term "unit" may be understood to mean a hardware component such as a processor or a circuit and/or a software component executable by a hardware component such as a processor.

The embodiments set forth herein are intended to provide examples and it will be apparent to those of ordinary skill in the art that various changes may be easily made in the embodiments without departing from the technical idea and indispensable features of the disclosure. Therefore, the embodiments set forth herein should be considered in descriptive sense only and not for purposes of limitation. For example, components described herein as being separated from each other may be embodied to be combined with each other, and similarly, components described herein as being combined with each other may be embodied separately from each other.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A device comprising:
    a processor; and
    a memory configured to store instructions executable by the processor,
    wherein the processor is configured to execute the instructions to:
        extract pieces of context information from displayed data based on an application, which is being executed by the device, wherein, the context information includes at least one of a photograph, picture, or text included in the displayed data,
        identify at least one face as a first identifier from a first context information and keywords as a second identifier and a third identifier, from a second context information, wherein, the first context information is at least one of the photograph or the picture and the second context information is the text,
        search for a plurality of recommended contacts related to the first identifier, the second identifier, and the third identifier,
        identify priorities of the plurality of recommended contacts,
        identify which application is to be linked to the each of the plurality of recommended contacts, and
        control to display the plurality of recommended contacts according to the priorities, and icons of applications linked to each of the plurality of recommended contacts together,
    wherein, at least one of size and color of each of the plurality of recommended contacts and each of the icons of applications linked thereto is differently displayed according to the priorities.

2. The device of claim 1,
    wherein the processor is further configured to:
        search for the plurality of recommended contacts related to the first identifier, the second identifier, and the third identifier based on the first identifier, the second identifier, the third identifier, and a relation graph obtained by inputting information regarding a communication between a plurality of users into a first training model for determining an association between the plurality of users, and
    wherein the association is represented by a predicate with a pair of pieces data or nodes as a subject and an object, respectively.

3. The device of claim 2,
    wherein the relation graph comprises:
        a plurality of nodes corresponding to the plurality of users; and
        at least one line representing a relation between the plurality of users, and
    wherein a thickness of the at least one line represents a strength of the relation between the plurality of users.

4. The device of claim 3, wherein the first training model is configured to:

analyze information regarding a history of use of the first identifier, the second identifier, and the third identifier in the information regarding the communication, assign a weight to used contact information according to which application the first identifier, the second identifier, and the third identifier are used, a period of use, a time when the first identifier, the second identifier, and the third identifier are used, a number of times of use of the first identifier, the second identifier, and the third identifier, and a place of use, and determine the plurality of recommended contacts based on the assigned weight.

5. The device of claim 3, wherein the processor is further configured to create an address book by identifying an intimacy between a plurality of pieces of contact information by using the first training model and classifying the plurality of pieces of contact information into a plurality of groups, based on the identified intimacy.

6. The device of claim 5, wherein the processor is further configured to:

obtain user schedule information, and control to display all contact information belonging to one of the plurality of groups as recommended contact information based on the obtained user schedule information.

7. The device of claim 3, wherein, when new contact information is obtained, the processor is further configured to add an address book by classifying the new contact information into one of a plurality of groups, based on information regarding a communication with a user having the new contact information.

8. The device of claim 7, wherein the processor is further configured to reclassify a group of contact information of which an intimacy is changed among a plurality of pieces of contact information.

9. The device of claim 1, wherein the processor is further configured to:

control to display a first-ranked recommended contact according to the priorities of the plurality of recommended contacts, and control to display a second-ranked recommended contact when communication with the first-ranked recommended contact fails.

10. The device of claim 1, wherein the processor is further configured to execute an application linked to a recommended contact selected in response to a user input selecting one of the plurality of recommended contacts.

11. The device of claim 10, wherein the processor is further configured to:

obtain user schedule information, and identify an application to be linked to the plurality of recommended contacts based on the obtained user schedule information.

12. The device of claim 1, wherein the processor is further configured to:

identify a plurality of applications to be linked to one recommended contact, identify priorities of the plurality of applications, based on a frequency of use of an application for communication with the one recommended contact, an execution time, an execution place, an execution period, and major functions, and control to display the plurality of applications according to priorities thereof when a recommended contact is selected by a user.

13. The device of claim 12, wherein the processor is further configured to:

execute a first-ranked application when the recommended contact is selected by the user, and execute a second-ranked application when a communication with the recommended contact using the first-ranked application fails.

14. The device of claim 1, wherein the processor is further configured to provide a document form in which a tone, grammar, a sentence structure, a paragraph format, or other document characteristic are predetermined, based on an intimacy with the plurality of recommended contacts.

15. The device of claim 1, wherein the processor is further configured to control to display the plurality of recommended contacts on a predetermined region of a screen of the device.

16. A method comprising:

extracting pieces of context information from displayed data based on an application that is being executed by a device, wherein, the context information includes at least one of a photograph, picture, or text included in the displayed data;

identifying at least one face as a first identifier from a first context information and keywords as a second identifier and a third identifier, from a second context information, wherein, the first context information is at least one of the photograph or the picture and the second context information is the text;

searching for a plurality of recommended contacts related to the first identifier, the second identifier, and the third identifier;

determining priorities of the plurality of recommended contacts;

identifying which application is to be linked to the each of the plurality of recommended contacts; and displaying the plurality of recommended contacts according to the priorities, and icons of applications linked to each of the plurality of recommended contacts together, wherein, at least one of size and color of each of the plurality of recommended contacts and each of the icons of applications linked thereto is differently displayed according to the priorities.

17. A non-transitory computer-readable recording medium having recorded thereon a program which, when executed by a computer, performs the method of claim 16.

* * * * *